US009191425B2

(12) United States Patent
Momchilov et al.

(10) Patent No.: US 9,191,425 B2
(45) Date of Patent: Nov. 17, 2015

(54) SYSTEMS AND METHODS FOR REMOTELY PRESENTING A MULTIMEDIA STREAM

(75) Inventors: Georgy Momchilov, Fort Lauderdale, FL (US); Todd Giebler, Fort Lauderdale, FL (US); Modesto Tabares, Fort Lauderdale, FL (US); Jacob Summers, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 1067 days.

(21) Appl. No.: 12/963,535

(22) Filed: Dec. 8, 2010

(65) Prior Publication Data
US 2011/0145431 A1 Jun. 16, 2011

Related U.S. Application Data

(60) Provisional application No. 61/267,686, filed on Dec. 8, 2009.

(51) Int. Cl.
*G06F 15/16* (2006.01)
*H04L 29/06* (2006.01)

(52) U.S. Cl.
CPC .......... *H04L 65/4084* (2013.01); *H04L 65/605* (2013.01)

(58) Field of Classification Search
None
See application file for complete search history.

(56) References Cited

U.S. PATENT DOCUMENTS 7,176,957 B2 2/2007 Ivashin et al.
7,310,680 B1* 12/2007 Graham ........................ 709/231
7,362,349 B2* 4/2008 Nelson et al. .............. 348/14.08
7,574,653 B2* 8/2009 Croney et al. .................. 715/249
8,793,331 B2 7/2014 Barreto et al.
2002/0013854 A1* 1/2002 Eggleston et al. ............ 709/234
2002/0161685 A1 10/2002 Dwinnell (Continued)

FOREIGN PATENT DOCUMENTS

CN         1913518       2/2007
EP         2 120 157     11/2009
JP         2009-521185   5/2009

OTHER PUBLICATIONS

Simoens, P. et al. Design and Implementation of a Hybrid Remote Display to Optimize Multimedia Experience on Thin Client Devices. (IEEE ATNAC 2008, pp. 391-396).*

(Continued)

*Primary Examiner* — Mohamed Ibrahim
*Assistant Examiner* — James Fiorillo
(74) *Attorney, Agent, or Firm* — Foley & Lardner LLP; John D. Lanza; James De Vellis

(57) ABSTRACT

A proxy streaming module executes on a first computing machine to stream multimedia data from a virtual channel that is established between the first computing machine and a second computing machine. In some instances, the multimedia data is generated by a multimedia device that communicates with the second computing machine. The proxy streaming module forwards the multimedia data to a presentation application that is executing on the first computing machine. A remoting application that executes on the first computing machine then captures the application output generated by the presentation application while the presentation application presents the multimedia data. The remoting application then transmits the application output to the second computing machine which displays the application output in an application output window.

22 Claims, 17 Drawing Sheets

(56) References Cited

U.S. PATENT DOCUMENTS

| | | | |
|---|---|---|---|
| 2003/0078986 A1* | 4/2003 | Ayres et al. | 709/217 |
| 2004/0199574 A1* | 10/2004 | Franco et al. | 709/201 |
| 2006/0010199 A1* | 1/2006 | Brailean et al. | 709/204 |
| 2006/0195881 A1* | 8/2006 | Segev et al. | 725/116 |
| 2006/0203758 A1 | 9/2006 | Tee et al. | |
| 2007/0005795 A1* | 1/2007 | Gonzalez | 709/232 |
| 2007/0070185 A1 | 3/2007 | Dy et al. | |
| 2007/0200923 A1* | 8/2007 | Eleftheriadis et al. | 348/14.08 |
| 2007/0263087 A1 | 11/2007 | Hong et al. | |
| 2008/0155113 A1 | 6/2008 | Lu et al. | |
| 2008/0225110 A1* | 9/2008 | Lin et al. | 348/14.03 |
| 2009/0031381 A1* | 1/2009 | Cohen et al. | 725/115 |
| 2009/0083432 A1* | 3/2009 | Saito et al. | 709/231 |
| 2009/0100460 A1* | 4/2009 | Hicks et al. | 725/35 |
| 2009/0254948 A1* | 10/2009 | Middleton et al. | 725/62 |
| 2009/0287772 A1 | 11/2009 | Stone et al. | |
| 2010/0250770 A1* | 9/2010 | Barreto et al. | 709/231 |
| 2011/0208837 A1* | 8/2011 | Sartori | 709/219 |
| 2012/0213294 A1* | 8/2012 | Hobgood et al. | 375/240.25 |

OTHER PUBLICATIONS

Lubonski, et al. "A Conceptual Architecture for Adaptation in Remote Desktop Systems Driven by the User Perception of Multimedia." (2005 Asia-Pacific Conference on Communications, Perth, Western Australia, Oct. 3-5, 2005, pp. 891-895).*
International Preliminary Report on Patentability on PCT/US2010/059526 dated Jun. 21, 2012.
International Search Report on PCT/US2010/059526 dated Aug. 23, 2011.
Office Action on U.S. Appl. No. 12/963,539 dated May 21, 2013.
Office Action on U.S. Appl. No. 12/963,539 dated Jul. 18, 2012.
Written Opinion on PCT/US2010/059526 dated Aug. 23, 2011.
EPO Communication on 10836637.8 dated Nov. 12, 2013.
Chinese Office Action on 201080063306.1 dated Apr. 1, 2014.
Chinese Office Action on 201080063306.1 dated Nov. 15, 2014.
Office Action on U.S. Appl. No. 12/963,539 dated Feb. 13, 2015.
Office Action on U.S. Appl. No. 12/963,539 dated Aug. 13, 2014.
Chinese Office Action on App. No. 201080063306.1 dated May 7, 2015.

* cited by examiner

SYSTEMS AND METHODS FOR REMOTELY PRESENTING A MULTIMEDIA STREAM

RELATED APPLICATIONS

This present application claims priority to a U.S. Provisional Application No. 61/267,686, entitled "Systems and Methods for Remotely Presenting a Multimedia System", filed on Dec. 8, 2009, which is incorporated herein by reference in its entirety.

FIELD OF THE DISCLOSURE

This application generally relates to remotely providing data. In particular, this application relates to remotely providing multimedia data generated by a multimedia device.

BACKGROUND OF THE DISCLOSURE

Over the past couple of years, there has been a steady increase in demand for video conferencing applications. Typically video conferencing requires an enormous amount of bandwidth and suffers from poor quality, latency and other similar issues. Many new technologies have been introduced to reduce some of the user experience problems inherent in past video conferencing applications including video codecs and anti jitter algorithms and protocols. These new technologies have allowed companies to rely on video conferencing as a tool to communicate with employees, vendors and clients remotely while reducing travel costs.

In many cases, employees do not have local access to video conferencing or other multimedia applications. Furthermore, many companies may require employees to use a particular video conferencing or multimedia application that is available only on a company's internal network. In these situations, employees who work remotely are unable to access the required applications. Thus, there is a need for a solution by which users can access remote display applications to display multimedia data generated locally by a multimedia device located remote from the display application. Similarly, there exists a need for a solution by which users can receive and display multimedia data on a local display application, where the multimedia data is generated remotely by a multimedia device located remote from the display application.

While there exists a number of different methods for permitting the remote display of multimedia output, none of these solutions take advantage of the technological advances in multimedia processing that reduce the undesired qualities typically present in a remote multimedia display application. Thus, there exists a need for a solution that takes advantage of the multimedia processing technologies such as those described above.

SUMMARY OF THE DISCLOSURE

The methods and systems described herein are embodiments of methods and systems for remotely providing multimedia data. Often times a user of a client computer connected to a multimedia device may wish to use an application remotely executing on a remote server, to display or otherwise modify output generated by the multimedia device. Access to the application, in many instances, can be provided via a thin client protocol. The application can receive the multimedia output from the client computer via a virtual channel over which the client computer can transmit the multimedia output using the thin client protocol. Transmitting multimedia data from one computer to another can be taxing on both systems because multimedia data can require a great deal of storage resources, computing (e.g. CPU) resources, memory resources and bandwidth resources.

In one aspect, described herein is a method for remotely presenting multimedia data generated by a multimedia device connected to a second computing machine. The method includes streaming multimedia data from a virtual channel established between a first computing machine and a second computing machine, where the multimedia data is generated by a multimedia device that communicates with a second computing machine. The multimedia data is streamed by a proxy streaming module that executes on the first computing machine and that forwards the multimedia data to a presentation application executing on the first computing machine. A first remoting application that executes on the first computing machine can capture the application output generated by the presentation application during the presentation of the multimedia data. The first remoting application can also transmit the application output to the second computing machine which can then display the application output in an application output window.

In some embodiments, the proxy streaming module can stream the multimedia data in response to receiving a request from a user of the second computing machine to execute the presentation application.

In other embodiments, a second remoting application that executes on the second computing machine can transmit the multimedia data from the second computing machine to the first computing machine over the virtual channel.

In one embodiment, a streaming module executing on the second computing machine, streams the multimedia data from a multimedia device interface, and then streams the multimedia data to the remoting application executing on the second computing machine.

Other embodiments include an encoder that executes on the second computing machine to encode the multimedia data before transmitting the multimedia data to the first computing machine. Still other embodiments include an encryption agent that executes on the second computing machine to encrypt the multimedia data before transmitting the multimedia data to the first computing machine.

The remoting application, in some embodiments, encapsulates the multimedia data in a protocol wrapper before transmitting the multimedia data to the first computing machine.

In some embodiments, a decoder executing on the first computing machine can decode the multimedia data before forwarding the multimedia data to the presentation application. The decoder, in some embodiments, can include a decryption agent.

In still other embodiments, the remoting application can un-encapsulate the multimedia data before forwarding the multimedia data to the presentation application.

The presentation application can, in some embodiments, store the multimedia data in a storage repository.

In yet another aspect, described herein is a system for remotely presenting multimedia data generated by a multimedia device connected to a second computing machine. This system, in some embodiments, can include a first computing machine and a second computing machine communicating with the first computing machine over a virtual channel established between the first computing machine and the second computing machine. The system can further include a multimedia device communicating with the second computing machine, and a proxy streaming module executing on the first computing machine to stream multimedia data from the virtual channel. The multimedia data, in some embodiments, is generated by the multimedia device, and forwarded by the proxy streaming module to a presentation application executing on the first computing machine. A remoting application executing on the first computing machine can capture application output generated by the presentation application during presentation of the multimedia data, and transmit the application output to the second computing machine.

In some embodiments, the second computing machine can display the application output in an application output window.

In yet another embodiment, the second computing machine can directly, or locally, display the multimedia data captured by the local multimedia device in an application output window.

In one aspect, the present application relates to a method for displaying on a local computing device, by an application executing on a remote computing device, multimedia data generated by a multimedia device connected to the local computing device. The remote computing device may be in communication with the local computing device via a virtual channel. A proxy streaming module executing on a remote computing device may stream multimedia data received from a local computing device via a virtual channel. The multimedia data may be generated by a multimedia device associated with the local computing device. The proxy streaming module may forward the multimedia data to a presentation application executing on the remote computing device, the presentation application generating multimedia application output. A remoting application executing on the remote computing device may capture the generated multimedia application output. The remoting application executing on the remote computing device may transmit the generated multimedia application output to the local computing device for display in an application output window on the local computing device.

In some embodiments, multimedia data is streamed responsive to receiving a request to execute the presentation application from a user of the local computing device. In other embodiments, a local streaming module executing on the local computing device transmits the multimedia data to the remote computing device via the virtual channel. In further embodiments, a local streaming module executing on the local computing device streams the multimedia data from a multimedia device interface. The local streaming module executing on the local computing device may stream the multimedia data to a local remoting application executing on the local computing device.

In some embodiments, an encoder executing on the local computing device encodes the multimedia data before transmitting the multimedia data to the remote computing device. In further embodiments, a decoder executing on the remote computing device decodes the multimedia data before forwarding the multimedia data to the presentation application. In some embodiments, a local remoting application on the local computing device constructs a packet to include the multimedia data in a protocol wrapper before transmitting the packet comprising the multimedia data to the remote computing device. In further embodiments, the remoting application executing on the remote computing device deconstructs the packet to extract the multimedia data from the packet before forwarding the multimedia data to the presentation application. In further embodiments, an encoder executing on the local computing device encrypts the multimedia data before transmitting the multimedia data to the remote computing device. In further embodiments, a decoder executing on the remote computing device decrypts the multimedia data before forwarding the multimedia data to the presentation application. In some embodiments, the presentation application stores the multimedia data in a storage repository.

In some aspects, the present disclosure relates to a system for displaying on a local computing device, by an application executing on a remote computing device. Multimedia data may be generated by a multimedia device connected to the local computing device. The remote computing device may be in communication with the local computing device via a virtual channel. The system may include a local computing device. The system may further include a multimedia device communicating with the local computing device, the multimedia device generating multimedia data. The system may also include a remote computing device hosting the executing of a proxy streaming module to stream multimedia data received from the local computing device via a virtual channel. The remote computing device may forward the multimedia data to a presentation application executing on the remote computing device. The presentation application may generate multimedia application output. The remoting application may capture the generated multimedia application output and transmit the multimedia application output to the local computing device for displaying in an application output window of the local computing device.

In some embodiments, the proxy streaming module streams the multimedia data responsive to receiving a request from a user of the local computing device to execute the presentation application. In other embodiments, a local remoting application executing on the local computing device transmits the multimedia data to the remote computing device over the virtual channel. In further embodiments, a streaming module executing on the local computing device streams the multimedia data from a multimedia interface to the remote application executing on the local computing device.

In some embodiments, an encoder executing on the local computing device encodes the multimedia data before transmitting the multimedia data to the remote computing device. In further embodiments, a decoder executing on the remote computing device decodes the multimedia data before forwarding the multimedia data to the presentation application. In other embodiments, the local remoting application executing on the local computing device constructs a packet to include the multimedia data in a protocol wrapper before transmitting the packet comprising the multimedia data to the remote computing device. In further embodiments, the remoting application executing on the remote computing device deconstructs the packet by extracting the multimedia data from the packet before forwarding the multimedia data to the presentation application. In further embodiments, the presentation application stores the multimedia data in a storage repository.

In some aspects, the present disclosure relates to a method for displaying on a client device, by an application executing on a remote server, multimedia data generated by a multimedia device connected to the client device. One or more filters of the client device may transform multimedia data to conform to a protocol of a virtual channel established between the client device and a remote server. A streaming module executing on the client device may forward compressed multimedia data to the remote server via the virtual channel. A proxy streaming module executing on the remote server may stream multimedia data received from the client device via the virtual channel. The proxy streaming module may forward multimedia data to a presentation application executing on the remote server. A remoting application executing on the remote server may capture application output generated by the presentation application during presentation of the multimedia data. The remoting application executing on the remote computing device may transmit the application output to the local computing device. The client device may display the application output in an application output window.

In some aspects, the present disclosure relates to methods and systems for displaying on multiple client devices, by one or more applications executing on one or more remote servers, multimedia data generated by a multimedia device connected to each of the remote client devices. For example, two or more clients may wish to communicate with each other via audio/video conferencing using their locally connected web cameras by processing the data from these cameras on one or more remote applications executing on one or more remote servers.

In such embodiments, a first multimedia data is generated by a multimedia device connected to a first client computing device. Second multimedia data may be generated by a second multimedia device connected to a second client computing device. The first and the second client computing devices may each be in communication with a remote server via one or more virtual channels. A first proxy streaming module executing on the remote server may stream multimedia data received from a first client computing device via a first virtual channel. A second proxy streaming module executing on the remote server may stream multimedia data received from a second client computing device via a second virtual channel. In some embodiments, a single proxy streaming module streams the multimedia data from both the first and the second client computing devices. The one or more proxy streaming modules may forward the multimedia data received from the first and the second client via the one or more virtual channels to a presentation application executing on the remote computing device. The presentation application may generate first multimedia application output for the first multimedia data and the second multimedia data application output for the second multimedia data. In some embodiments, multiple presentation applications generate the first and the second multimedia application outputs.

A first remoting application executing on the remote computing device may capture the generated first multimedia application output for the first client. A second remoting application executing on the remote computing device may capture the generated second multimedia application output for the second client. The first remoting application executing on the remote computing device may transmit the generated first multimedia application output to the first client. The second remoting application executing on the remote computing device may transmit the generated second multimedia application output to the second client. The first client may display in an application output window on the first client the generated first multimedia application output. The second client may display in an application output window on the second client the generated second multimedia application output.

However, in some embodiments, the first and the second clients may each receive and display the first and the second generated multimedia application outputs. For example, the first client may receive from the first and the second remoting application both the first and the second generated multimedia application outputs. Similarly, the second client may receive both the first and the second generated multimedia application outputs. In such embodiments, the first client displays in one or more local application output windows the generated first multimedia application output and the second multimedia application output. The second client may also display in one or more local application output windows the generated first multimedia application output and the second multimedia application output. The first client and the second client may thus implement audio/video conferencing while processing their audio/video data generated by their locally connected multimedia capture devices on one or more applications executing on one or more remote servers.

In some embodiments, the remote server includes one or more filters or functions enabling the operation of the presentation application with the multimedia data from the remote clients. The one or more filters may comprise or utilize any of the proxy streaming modules and remoting applications to ensure that the presentation application treats the multimedia data from each of the remote clients as multimedia data generated by a locally connected multimedia capture device. For example, the one or more filters may cause the presentation application to register the one or more filters as a multimedia capture device, such as a web camera, locally connected to the remote client or the server. The presentation application which may be designed to operate with locally connected multimedia capture devices only may continue to operate with a multimedia capture device connected to a remote client without any modifications to the presentation application. The presentation application may treat and communicate with the one or more filters in a manner in which it communicates with a locally connected multimedia capture device.

Similarly, on the client side, the client may include one or more filters or functions enabling the client to receive the multimedia data generated by a locally connected multimedia capture device and transmit the received multimedia data to the remote server. The one or more filters may also enable the client to receive the generated multimedia application output from the remote server and display the received generated multimedia application output locally. The one or more filters may satisfy all the requirements of the presentation application executing on the remote server. The one or more filters on the client and the server side may enable the client and the server to process, modify and/or edit the multimedia data received from the locally stored multimedia capture device in a manner in which it can be received, processed and transmitted by the presentation application executing on the remote server.

BRIEF DESCRIPTION OF THE DRAWINGS

The following figures depict certain illustrative embodiments of the methods and systems described herein, in which like reference numerals refer to like elements. These depicted embodiments are to be understood as illustrative of the disclosed methods and systems and not as limiting in any way.

DETAILED DESCRIPTION OF THE DRAWINGS

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for virtualizing a computing environment; and Section C describes embodiments of systems and methods for remotely presenting a multimedia data stream.

A. Network and Computing Environment

Figure 1A:
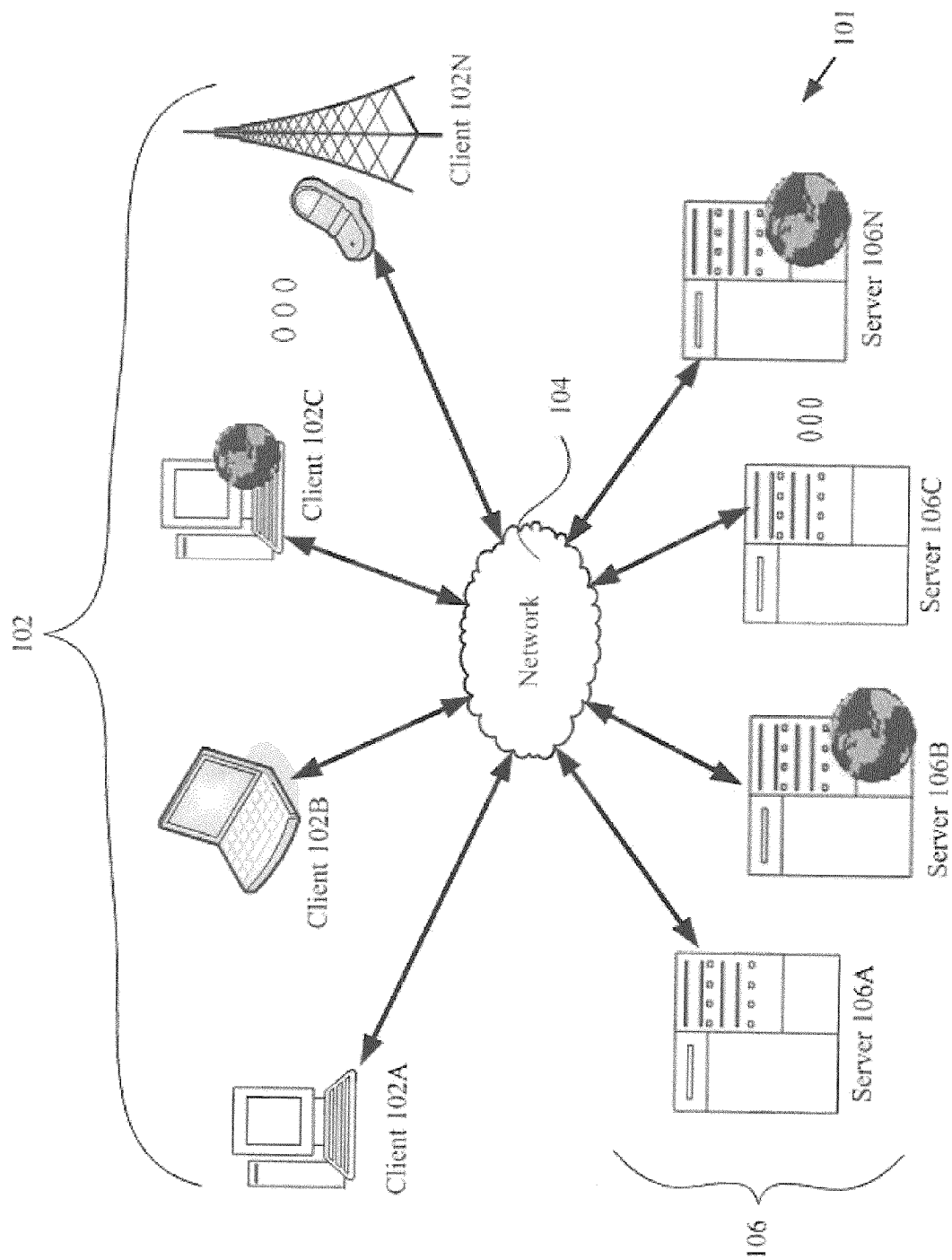
FIG. 1A depicts embodiments of network environments that provide remote access to computing devices that can execute application programs.

FIG. 1A illustrates one embodiment of a computing environment 101 that includes one or more client machines 102A-102N (generally referred to herein as "client machine(s) 102") that are in communication with one or more servers 106A-106N (generally referred to herein as "server(s) 106"). Installed in between the client machine(s) 102 and server(s) 106 is a network 104.

In one embodiment, the computing environment 101 can include an appliance installed between the server(s) 106 and client machine(s) 102. This appliance can manage client/server connections, and in some cases can load balance client connections amongst a plurality of backend servers.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); a second machine; a first machine; or a third machine. The server 106, in some embodiments, may be referenced by any one of the following terms: server(s), local machine; remote machine; server farm(s), host computing device(s), a first machine(s); or a second machine(s).

In one embodiment, the client machine 102 can be a virtual machine 102C. The virtual machine 102C can be any virtual machine, while in some embodiments the virtual machine 102C can be any virtual machine managed by a hypervisor developed by XenSolutions, Citrix Systems, IBM, VMware, or any other hypervisor. In other embodiments, the virtual machine 102C can be managed by any hypervisor, while in still other embodiments, the virtual machine 102C can be managed by a hypervisor executing on a server 106 or a hypervisor executing on a client 102.

The client machine 102 can in some embodiments execute, operate or otherwise provide an application that can be any one of the following: software; a program; executable instructions; a virtual machine; a hypervisor; a web browser; a web-based client; a client-server application; a thin-client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 1B:
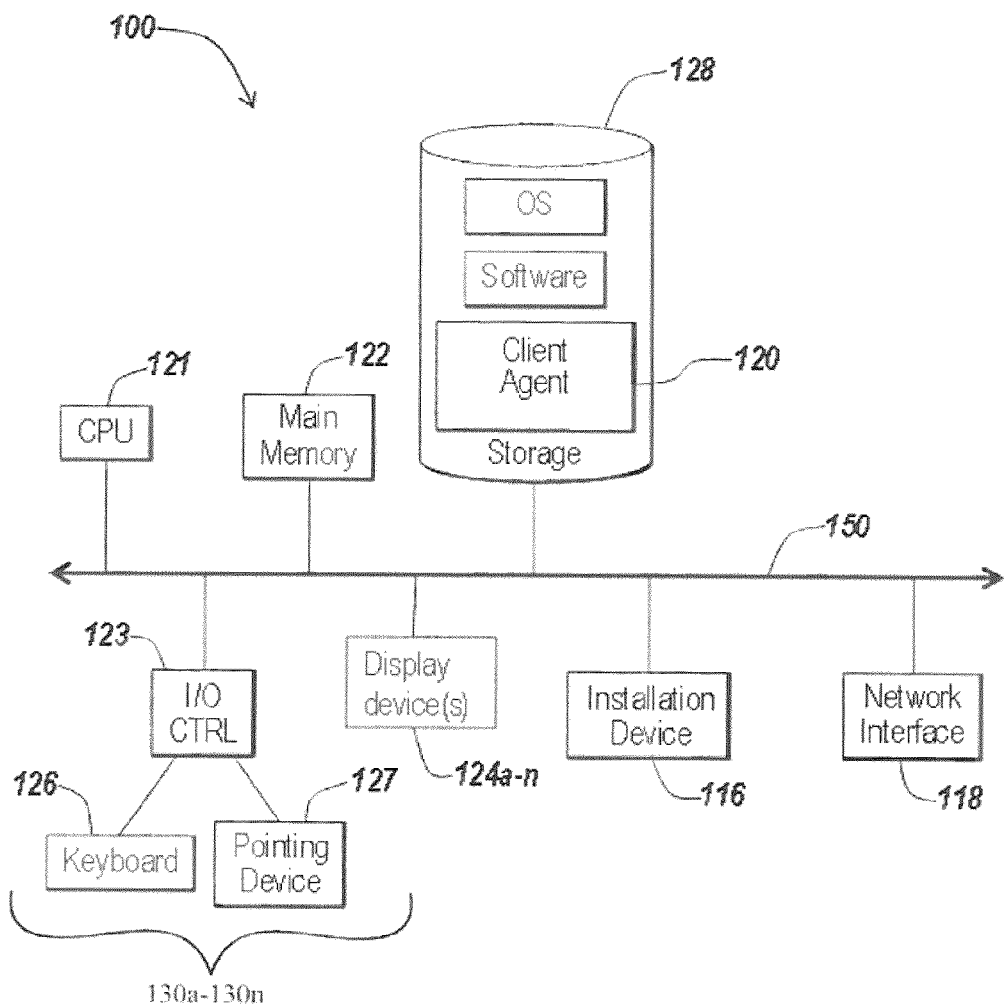
FIG. 1B and FIG. 1C depict embodiments of computing devices.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
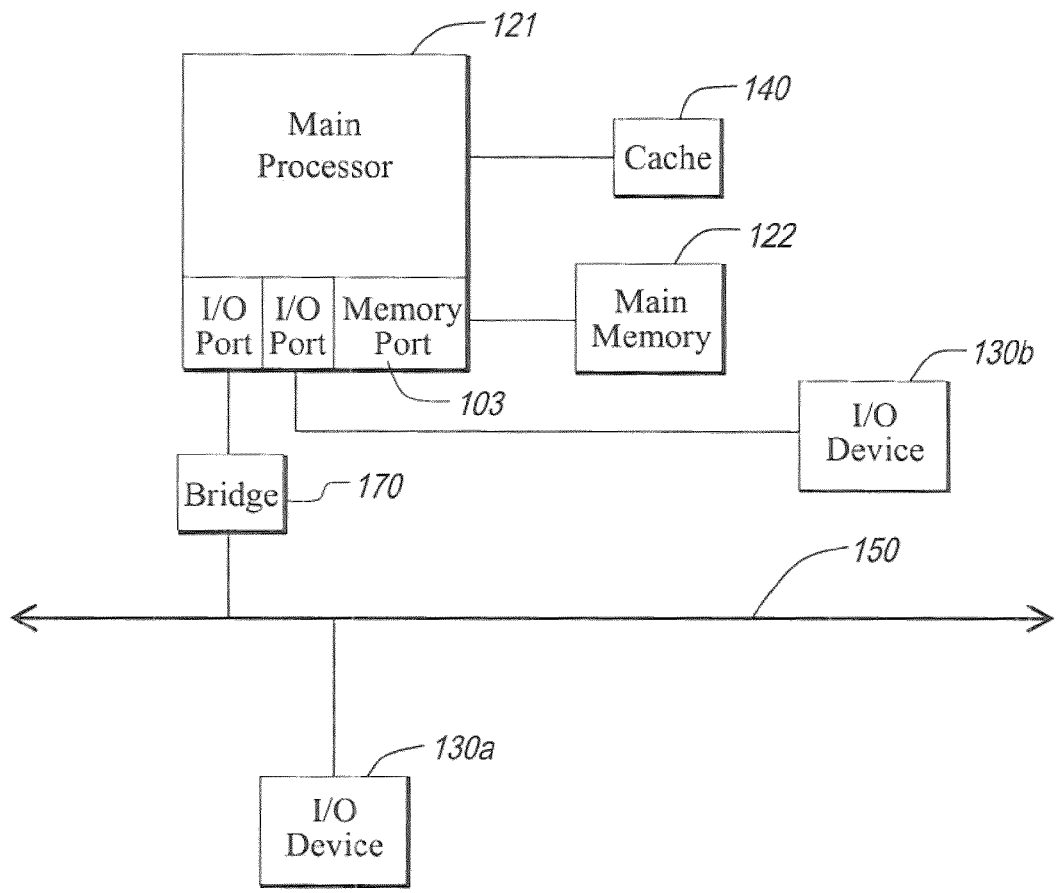

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; WINDOWS VISTA; WINDOWS 7; WINDOWS SERVER 2008 R2; and the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

Figure 1D:
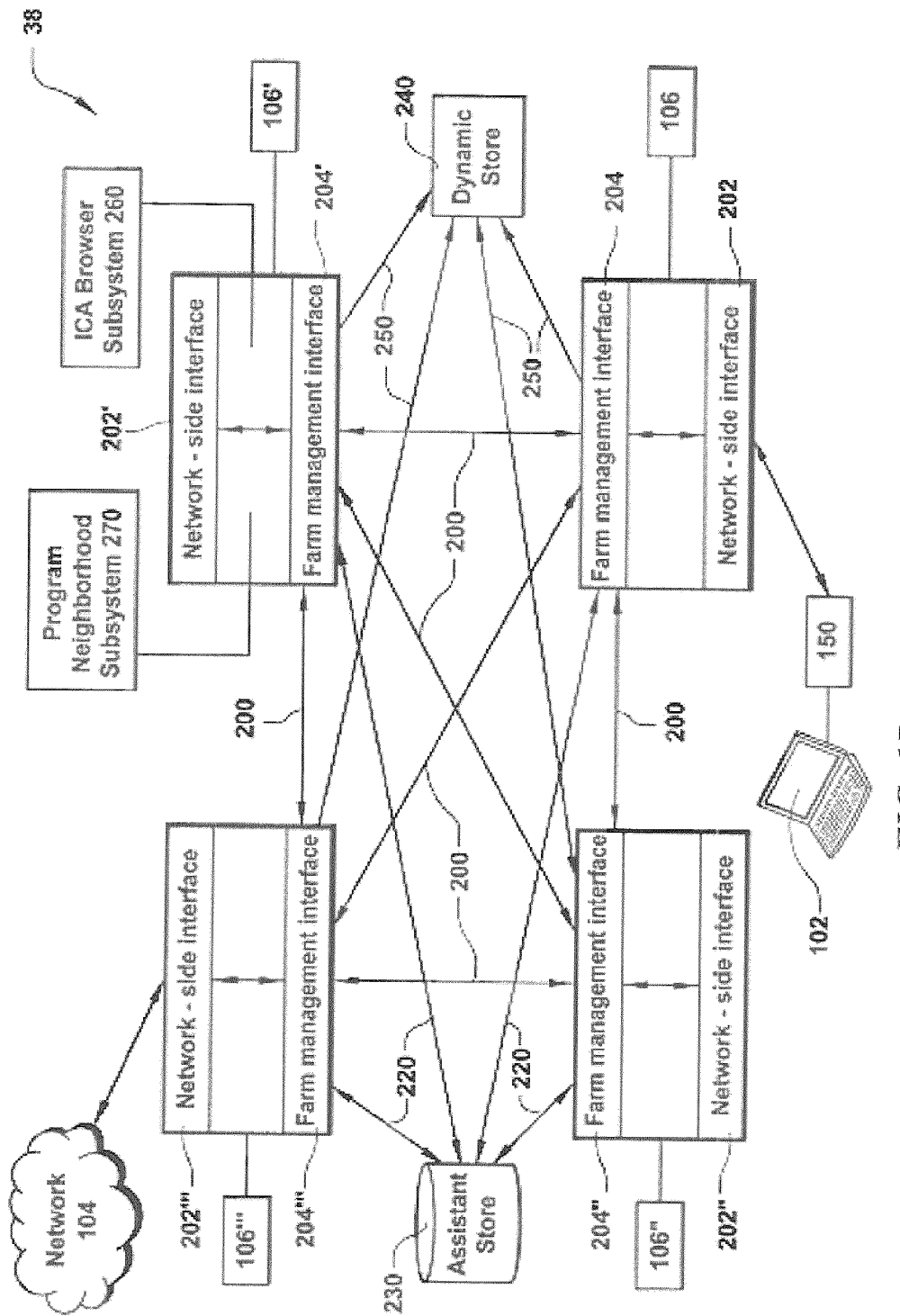
FIG. 1D illustrates a block diagram depicting an embodiment of a server farm.

Referring now to FIG. 1D, in some embodiments more than one server 106 can be logically linked to create a server farm 38, where each server 106 can include a network-side interface 202 and a farm-side interface 204. The network-side interface 202 can be in communication with one or more clients 102 or a network 104. The network 104 can be a WAN, LAN, or any other network described herein.

In one embodiment, each server 106 has a farm-side interface 204 that can connect with one or more servers 106 in the farm 38. In some embodiments, each server 106 can connect with another server 106 in the farm 38 via the other server's farm-side interface and such that both servers' farm-side interfaces 204 are interconnected. When connected, servers 106 within the server farm 38 can communicate with one another.

In some embodiments, the farm-side interface 204 can communicate with the network-side interface 202, a persistent store 230 and, in some embodiments, with a dynamic store 240. The farm 38, in some embodiments, can include a combination of servers 106, a persistent store 230, and a dynamic store 240. The server 106, in some embodiments, can communicate with the persistent store 230, while other servers 106' communicate with the server 106 to access information stored in the persistent store.

In one embodiment, the persistent store 230 may be physically implemented on a disk, disk farm, a redundant array of independent disks (RAID), writeable compact disc, or any other device that allows data to be read and written and that maintains written data if power is removed from the storage device. A single physical device may provide storage for a plurality of persistent stores, i.e., a single physical device may be used to provide the persistent store 230 for more than one farm 38. The persistent store 230 can maintain static data associated with each server 106 in the farm 38, as well as the global data used by the servers 106 within the farm 38. In one embodiment, the persistent store 230 may maintain the server data in a Lightweight Directory Access Protocol (LDAP) data model. In other embodiments, the persistent store 230 can store the server data in an ODBC-compliant database. For the purposes of this description, the term "static data" can refer to data that does not change frequently, i.e., data that changes only on an hourly, daily, or weekly basis, or data that never changes. Each server can, in some embodiments, use a persistent storage subsystem to read data from and write data to the persistent store 230.

The data stored by the persistent store 230 may be replicated for reliability purposes either physically or logically. For example, physical redundancy may be provided using a set of redundant, mirrored disks, where each disk provides a copy of the data. In other embodiments, the database itself may be replicated using standard database techniques to provide multiple copies of the database. In further embodiments, both physical and logical replication may be used concurrently.

The dynamic store 240 can be centralized such that the runtime data is stored in the memory of one server 106 in the farm 38. That server can then operate as a master network node with which all other servers 106 in the farm 38 communicate when seeking access to runtime data. In another embodiment, each server 106 in the farm 38 can keep a full copy of the dynamic store 240 such that each server 106 communicates with every other server 106 to keep its copy of the dynamic store 240 up to date. In still another embodiment, each server 106 maintains its own runtime data and communicates with other servers 106 when seeking to obtain runtime data from them. Thus, for example, a server 106 attempting to find an application program requested by the client 102 may communicate directly with every other server 106 in the farm 38 to identify one or more servers hosting the requested application.

In some embodiments, heavy network traffic generated by farms 38 that have a large number of servers 106, can be alleviated by designating a subset of the servers 106 in the farm 38, typically two or more, as "collector points." A collector point, in some embodiments, can be a server 106 that collects and stores runtime data collected from other servers 106 in the farm 38. In some embodiments, each collector point can store a copy of the entire dynamic store 240, while in other embodiments, each collector point stores a portion of the dynamic store 240, i.e. the collector point maintains runtime data of a particular data type. The type of data stored by a server 106 may be predetermined according to one or more criteria. For example, servers 106 may store different types of data based on their boot order. Alternatively, the type of data stored by a server 106 may be configured by an administrator using an administration tool (Not Shown.) In these embodiments, the dynamic store 240 can be distributed amongst two or more servers 106 in the farm 38.

Servers 106 not designated as collector points can, in some embodiments, identify servers 106 that have been designated as collector points. Upon identifying these collector points, the servers 106 can communicates with the identified collector points to deliver and request runtime data. Using collector points, in one embodiment, can mitigate traffic caused by a large server farm 38 by allowing servers 106 to communicate with one or more collector points rather than every other server 106. Thus, requesting and delivering access to runtime data can be a less bandwidth intensive process.

Each server 106 can operate as a collector point for more than one type of data. For example, a first server 106" can operate as a collector point for licensing information and for loading information. In these embodiments, each collector point may amass a different type of run-time data. For example, a second server 106''' can collect licensing information, while the first server 106" collects loading information.

In some embodiments, each collector point can store data that is shared between all servers 106 in a farm 38. In these embodiments, each collector point of a particular type of data exchanges the data collected by that collector point with every other collector point for that type of data in the farm 38. Thus, upon completion of the exchange of such data, each collector point 106" and 106 possesses the same data. Also in these embodiments, each collector point 106 and 106" also keeps every other collector point abreast of any updates to the runtime data.

A client 102, in some embodiments, can view applications executing within the farm 38 and can access available information and application sessions executing within the farm 38, by browsing the contents and activity within a farm 38. In some embodiments, each server 106 can include an ICA browsing subsystem 260 that can provide the client 102 with browsing capabilities. After the client 102 establishes a connection with the ICA browser subsystem 260 of any of the servers 106, that browser subsystem can support a variety of client requests. Such client requests can include: (1) enumerating names of servers in the farm, (2) enumerating names of applications published in the farm, (3) resolving a server name and/or application name to a server address that is useful the client 102. The ICA browser subsystem 260 can also support requests made by clients 102 running a program neighborhood application that provides the client 102, upon request, with a view of those applications within the farm 38 for which the user is authorized. In some embodiments, the ICA browser subsystem 260 can forward all of the above-mentioned client requests to the appropriate subsystem in the server 106.

In one embodiment, each server 106 in the farm 38 that has a program neighborhood subsystem 270 can provide the user of a client 102 with a view of applications within the farm 38. The program neighborhood subsystem 270 may limit the view to those applications for which the user of the client 102 has authorization to access. Typically, this program neighborhood service presents the applications to the user as a list or a group of icons.

The functionality provided by the program neighborhood subsystem 270 can be available to two types of clients, (1) program neighborhood-enabled clients that can access the functionality directly from a client desktop, and (2) non-program neighborhood-enabled clients (e.g., legacy clients) that can access the functionality by running a program neighborhood-enabled desktop on the server.

Communication between a program neighborhood-enabled client and the program neighborhood subsystem 270 may occur over a dedicated virtual channel that is established on top of an ICA virtual channel. In other embodiments, the communication occurs using an XML service. In one of these embodiments, the program neighborhood-enabled client communicates with an XML subsystem.

In one embodiment, the program neighborhood-enabled client does not have a connection with the server with a program neighborhood subsystem 270. For this embodiment, the client 102 sends a request to the ICA browser subsystem 260 to establish an ICA connection to the server 106 in order to identify applications available to the client 102. The client 102 then runs a client-side dialog that acquires the credentials of a user. The credentials are received by the ICA browser subsystem 260 and sent to the program neighborhood subsystem 270. In one embodiment, the program neighborhood subsystem 270 sends the credentials to a user management subsystem for authentication. The user management subsystem may return a set of distinguished names representing the list of accounts to which the user belongs. Upon authentication, the program neighborhood subsystem 270 establishes the program neighborhood virtual channel. This channel remains open until the application filtering is complete. The program neighborhood subsystem 270 can then request the program neighborhood information from the common application subsystem 524 associated with those accounts. The common application subsystem 524 can then obtain the program neighborhood information from the persistent store 230. On receiving the program neighborhood information, the program neighborhood subsystem 270 formats and returns the program neighborhood information to the client over the program neighborhood virtual channel. Then, in some embodiments, the partial ICA connection is closed.

For another example in which the program neighborhood-enabled client establishes a partial ICA connection with a server, consider the user of the client 102 who selects a farm 38. The selection of the farm 38 sends a request from the client 102 to the ICA browser subsystem 260 to establish an ICA connection with one of the servers 106 in the selected farm 38. The ICA browser subsystem 260 can then send a request to the program neighborhood subsystem 270, which selects a server 106 in the farm 38. Address information associated with the server 106 can be identified and returned to the client 102 by way of the ICA browser subsystem 260. The client 102 can then subsequently connect to the server 106 corresponding to the received address information.

In another embodiment, the program neighborhood-enabled client 102 establishes an ICA connection upon which the program neighborhood-virtual channel can be established, where the connection can remain open for as long as the ICA connection persists. Over this program neighborhood virtual channel, the program neighborhood subsystem 270 can push program neighborhood information updates to the client 102. To obtain updates, the program neighborhood subsystem 270 subscribes to events from the common application subsystem 524 to allow the program neighborhood subsystem 270 to detect changes to published applications.

B. Virtualized Computing Environment

Figure 2A:
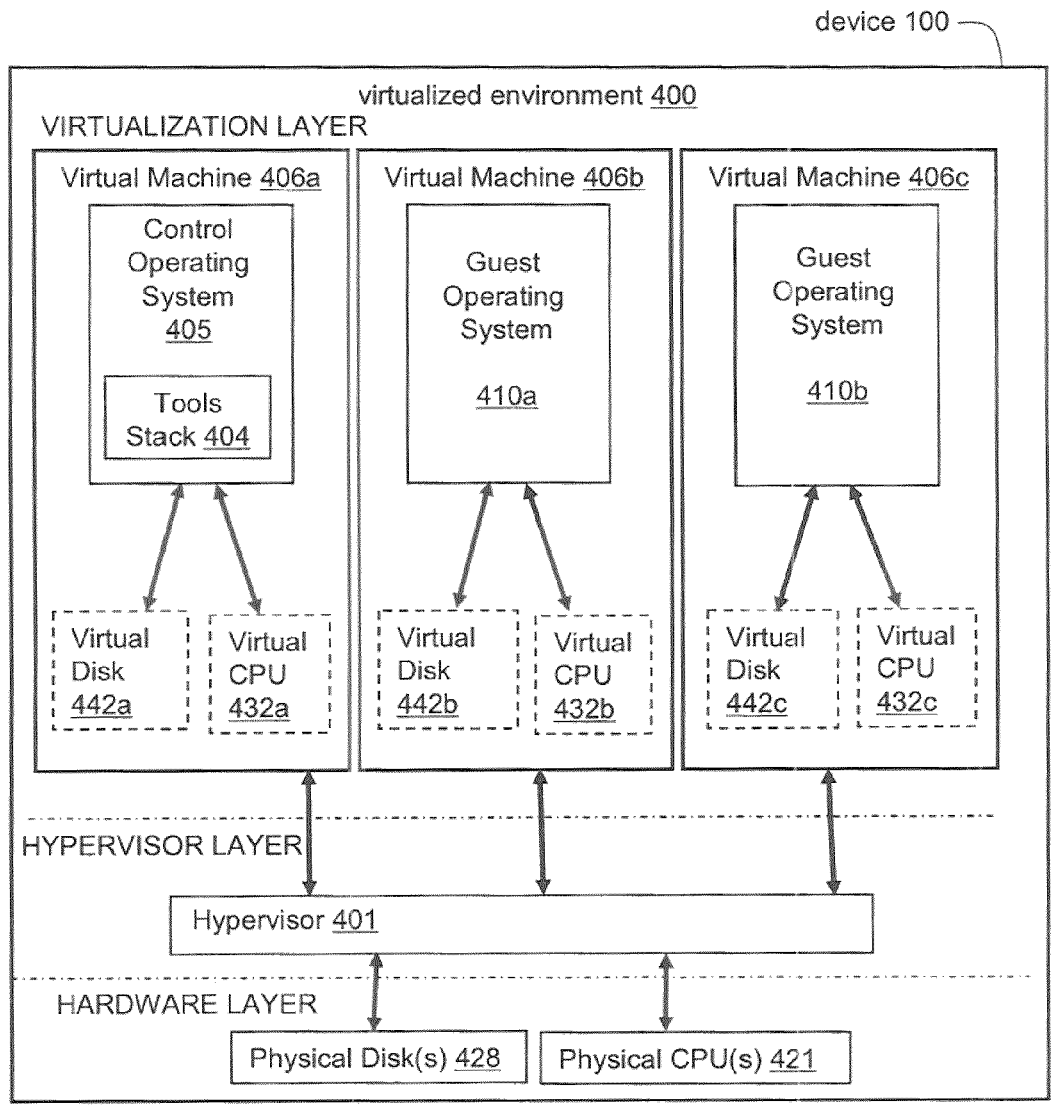
FIGS. 2A-2C illustrate block diagrams of embodiments of a virtualization environment.

Referring now to FIG. 2A, a block diagram depicts one embodiment of a virtualization environment 400. In brief overview, a computing device 100 includes a hypervisor layer, a virtualization layer, and a hardware layer. The hypervisor layer includes a hypervisor 401 (also referred to as a virtualization manager) that allocates and manages access to a number of physical resources in the hardware layer (e.g., the processor(s) 421, and disk(s) 428) by at least one virtual machine executing in the virtualization layer. The virtualization layer includes at least one operating system 410 and a plurality of virtual resources allocated to the at least one operating system 410. Virtual resources may include, without limitation, a plurality of virtual processors 432a, 432b, 432c (generally 432), and virtual disks 442a, 442b, 442c (generally 442), as well as virtual resources such as virtual memory and virtual network interfaces. The plurality of virtual resources and the operating system 410 may be referred to as a virtual machine 406. A virtual machine 406 may include a control operating system 405 in communication with the hypervisor 401 and used to execute applications for managing and configuring other virtual machines on the computing device 100.

In greater detail, a hypervisor 401 may provide virtual resources to an operating system in any manner which simulates the operating system having access to a physical device. A hypervisor 401 may provide virtual resources to any number of guest operating systems 410a, 410b (generally 410). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 401 executes within an operating system executing on a computing device. In one of these embodiments, a computing device executing an operating system and a hypervisor 401 may be said to have a host operating system (the operating system executing on the computing device), and a guest operating system (an operating system executing within a computing resource partition provided by the hypervisor 401). In other embodiments, a hypervisor 401 interacts directly with hardware on a computing device, instead of executing on a host operating system. In one of these embodiments, the hypervisor 401 may be said to be executing on "bare metal," referring to the hardware comprising the computing device.

In some embodiments, a hypervisor 401 may create a virtual machine 406a-c (generally 406) in which an operating system 410 executes. In one of these embodiments, for example, the hypervisor 401 loads a virtual machine image to create a virtual machine 406. In another of these embodiments, the hypervisor 401 executes an operating system 410 within the virtual machine 406. In still another of these embodiments, the virtual machine 406 executes an operating system 410.

In some embodiments, the hypervisor 401 controls processor scheduling and memory partitioning for a virtual machine 406 executing on the computing device 100. In one of these embodiments, the hypervisor 401 controls the execution of at least one virtual machine 406. In another of these embodiments, the hypervisor 401 presents at least one virtual machine 406 with an abstraction of at least one hardware resource provided by the computing device 100. In other embodiments, the hypervisor 401 controls whether and how physical processor capabilities are presented to the virtual machine 406.

A control operating system 405 may execute at least one application for managing and configuring the guest operating systems. In one embodiment, the control operating system 405 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 401 executes the control operating system 405 within a virtual machine 406 created by the hypervisor 401. In still another embodiment, the control operating system 405 executes in a virtual machine 406 that is authorized to directly access physical resources on the computing device 100. In some embodiments, a control operating system 405a on a computing device 100a may exchange data with a control operating system 405b on a computing device 100b, via communications between a hypervisor 401a and a hypervisor 401b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 405 executes in a virtual machine 406 that is authorized to interact with at least one guest operating system 410. In another embodiment, a guest operating system 410 communicates with the control operating system 405 via the hypervisor 401 in order to request access to a disk or a network. In still another embodiment, the guest operating system 410 and the control operating system 405 may communicate via a communication channel established by the hypervisor 401, such as, for example, via a plurality of shared memory pages made available by the hypervisor 401.

In some embodiments, the control operating system 405 includes a network back-end driver for communicating directly with networking hardware provided by the computing device 100. In one of these embodiments, the network back-end driver processes at least one virtual machine request from at least one guest operating system 110. In other embodiments, the control operating system 405 includes a block back-end driver for communicating with a storage element on the computing device 100. In one of these embodiments, the block back-end driver reads and writes data from the storage element based upon at least one request received from a guest operating system 410.

In one embodiment, the control operating system 405 includes a tools stack 404. In another embodiment, a tools stack 404 provides functionality for interacting with the hypervisor 401, communicating with other control operating systems 405 (for example, on a second computing device 100*b*), or managing virtual machines 406*b*, 406*c* on the computing device 100. In another embodiment, the tools stack 404 includes customized applications for providing improved management functionality to an administrator of a virtual machine farm. In some embodiments, at least one of the tools stack 404 and the control operating system 405 include a management API that provides an interface for remotely configuring and controlling virtual machines 406 running on a computing device 100. In other embodiments, the control operating system 405 communicates with the hypervisor 401 through the tools stack 104.

In one embodiment, the hypervisor 401 executes a guest operating system 410 within a virtual machine 406 created by the hypervisor 401. In another embodiment, the guest operating system 410 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 410, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 401. In such an embodiment, the driver may be aware that it executes within a virtualized environment. In another embodiment, the guest operating system 410, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 405, as described above.

Figure 2B:
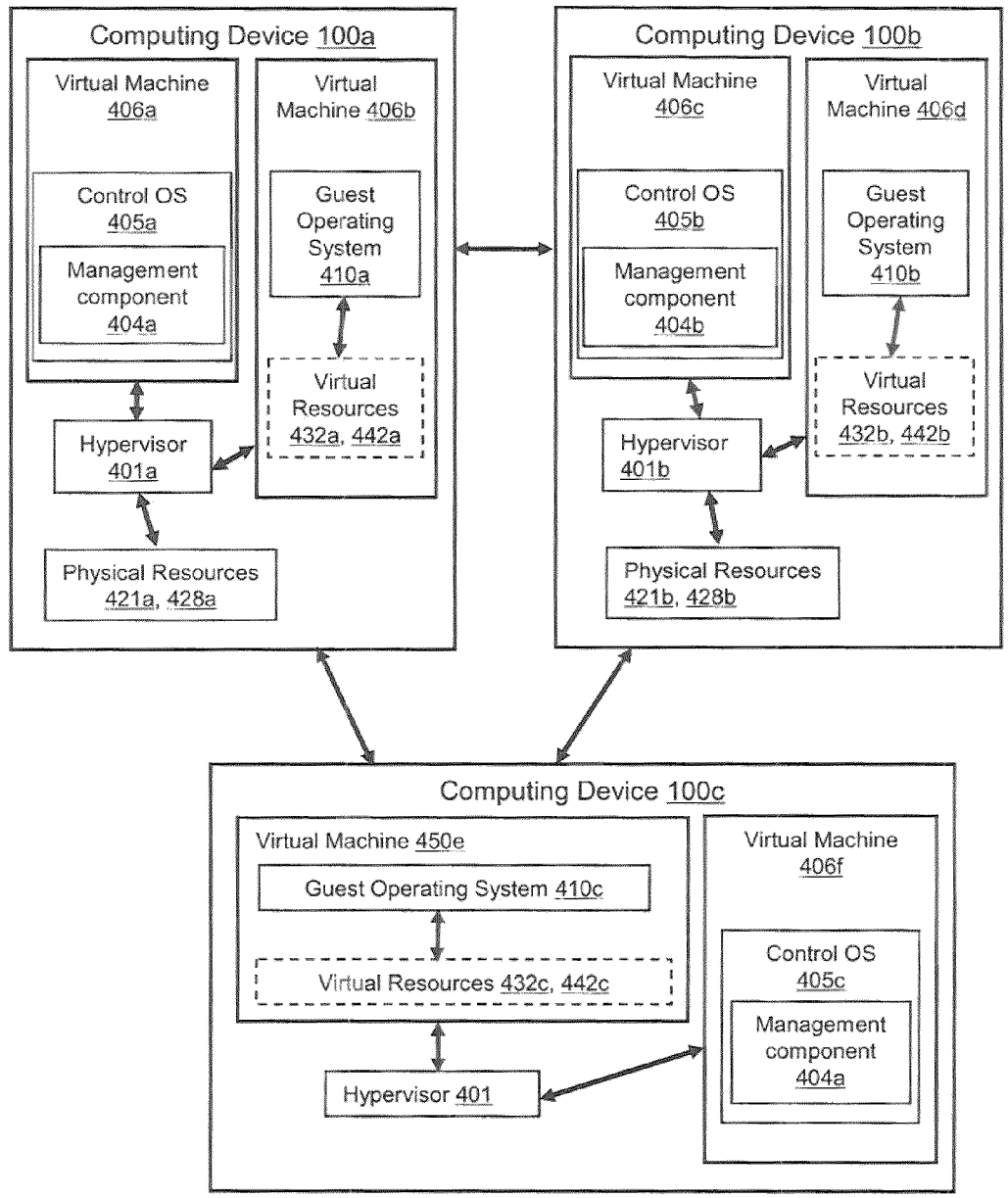

Referring now to FIG. 2B, a block diagram depicts one embodiment of a plurality of networked computing devices in a system in which at least one physical host executes a virtual machine. In brief overview, the system includes a management component 404 and a hypervisor 401. The system includes a plurality of computing devices 100, a plurality of virtual machines 406, a plurality of hypervisors 401, a plurality of management components referred to as tools stacks 404, and a physical resource 421, 428. The plurality of physical machines 100 may each be provided as computing devices 100 such as those described herein.

In greater detail, a physical disk 428 is provided by a computing device 100 and stores at least a portion of a virtual disk 442. In some embodiments, a virtual disk 442 is associated with a plurality of physical disks 428. In one of these embodiments, one or more computing devices 100 may exchange data with one or more of the other computing devices 100 regarding processors and other physical resources available in a pool of resources, allowing a hypervisor to manage a pool of resources distributed across a plurality of physical computing devices. In some embodiments, a computing device 100 on which a virtual machine 406 executes is referred to as a physical host 100 or as a host machine 100.

The hypervisor executes on a processor on the computing device 100. The hypervisor allocates, to a virtual disk, an amount of access to the physical disk. In one embodiment, the hypervisor 401 allocates an amount of space on the physical disk. In another embodiment, the hypervisor 401 allocates a plurality of pages on the physical disk. In some embodiments, the hypervisor provisions the virtual disk 442 as part of a process of initializing and executing a virtual machine 450.

In one embodiment, the management component 404*a* is referred to as a pool management component 404*a*. In another embodiment, a management operating system 405*a*, which may be referred to as a control operating system 405*a*, includes the management component. In some embodiments, the management component is referred to as a tools stack. In one of these embodiments, the management component is the tools stack 404 described above in connection with FIG. 2A. In other embodiments, the management component 404 provides a user interface for receiving, from a user such as an administrator, an identification of a virtual machine 406 to provision and/or execute. In still other embodiments, the management component 404 provides a user interface for receiving, from a user such as an administrator, the request for migration of a virtual machine 406*b* from one physical machine 100 to another. In further embodiments, the management component 404*a* identifies a computing device 100*b* on which to execute a requested virtual machine 406*d* and instructs the hypervisor 401*b* on the identified computing device 100*b* to execute the identified virtual machine; such a management component may be referred to as a pool management component.

Figure 2C:
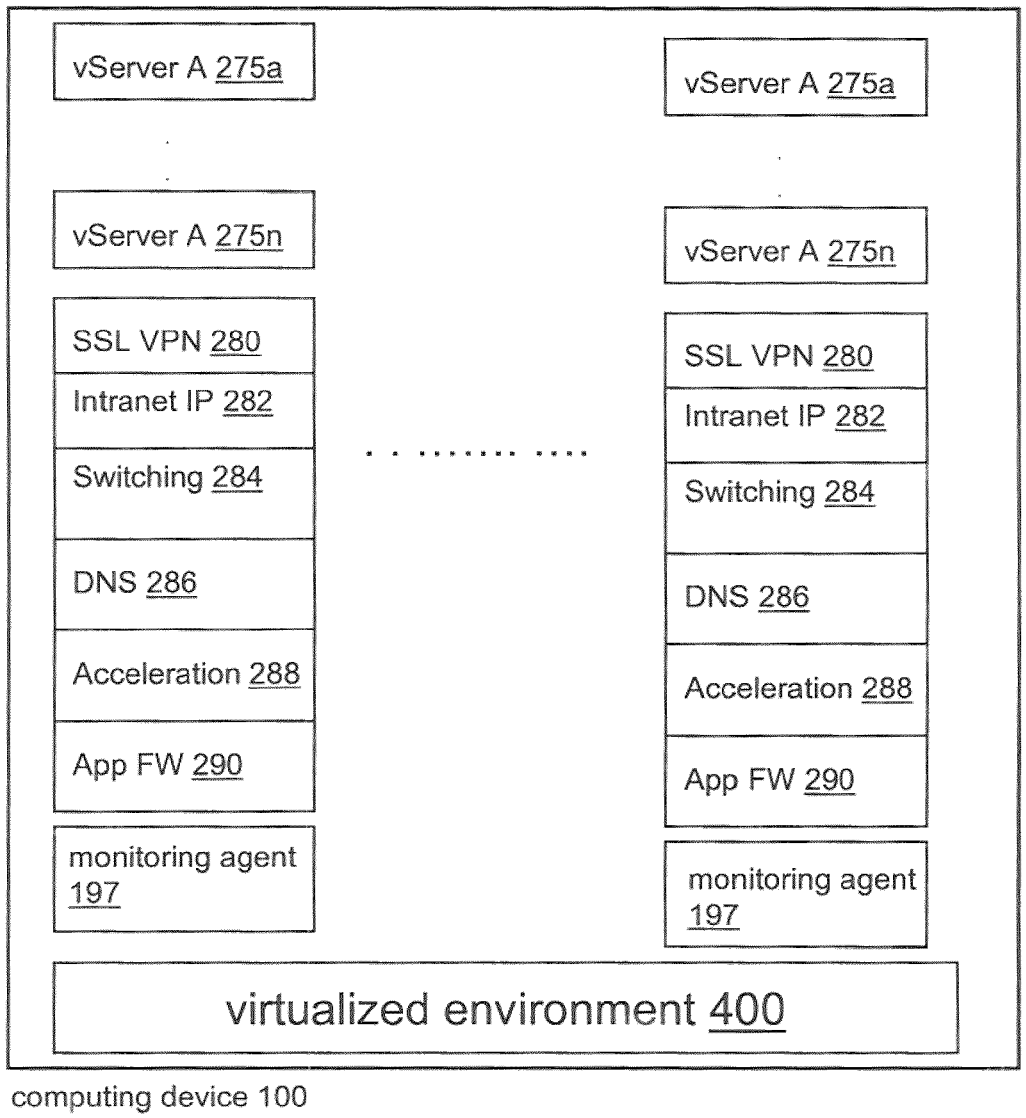

Referring now to FIG. 2C, embodiments of a virtual application delivery controller or virtual appliance 450 are depicted. In brief overview, any of the functionality and/or embodiments of the appliance 200 (e.g., an application delivery controller) described above in connection with FIGS. 2A and 2B may be deployed in any embodiment of the virtualized environment described above in connection with FIGS. 4A and 4B. Instead of the functionality of the application delivery controller being deployed in the form of an appliance 200, such functionality may be deployed in a virtualized environment 400 on any computing device 100, such as a client 102, server 106 or appliance 200.

Referring now to FIG. 2C, a diagram of an embodiment of a virtual appliance 450 operating on a hypervisor 401 of a server 106 is depicted. As with the appliance 200 of FIGS. 2A and 2B, the virtual appliance 450 may provide functionality for availability, performance, offload and security. For availability, the virtual appliance may perform load balancing between layers 4 and 7 of the network and may also perform intelligent service health monitoring. For performance increases via network traffic acceleration, the virtual appliance may perform caching and compression. To offload processing of any servers, the virtual appliance may perform connection multiplexing and pooling and/or SSL processing. For security, the virtual appliance may perform any of the application firewall functionality and SSL VPN function of appliance 200.

Any of the modules of the appliance 200 as described in connection with FIG. 2A may be packaged, combined, designed or constructed in a form of the virtualized appliance delivery controller 450 deployable as one or more software modules or components executable in a virtualized environment 300 or non-virtualized environment on any server, such as an off the shelf server. For example, the virtual appliance may be provided in the form of an installation package to install on a computing device. With reference to FIG. 2A, any of the cache manager 232, policy engine 236, compression 238, encryption engine 234, packet engine 240, GUI 210, CLI 212, shell services 214 and health monitoring programs 216 may be designed and constructed as a software component or module to run on any operating system of a computing device and/or of a virtualized environment 300. Instead of using the encryption processor 260, processor 262, memory 264 and network stack 267 of the appliance 200, the virtualized appliance 400 may use any of these resources as provided by the virtualized environment 400 or as otherwise available on the server 106.

Still referring to FIG. 2C, and in brief overview, any one or more vServers 275A-275N may be in operation or executed in a virtualized environment 400 of any type of computing device 100, such as any server 106. Any of the modules or functionality of the appliance 200 described in connection with FIG. 2B may be designed and constructed to operate in either a virtualized or non-virtualized environment of a server. Any of the vServer 275, SSL VPN 280, Intranet UP 282, Switching 284, DNS 286, acceleration 288, App FW 280 and monitoring agent may be packaged, combined, designed or constructed in a form of application delivery controller 450 deployable as one or more software modules or components executable on a device and/or virtualized environment 400.

In some embodiments, a server may execute multiple virtual machines 406a-406n in the virtualization environment with each virtual machine running the same or different embodiments of the virtual application delivery controller 450. In some embodiments, the server may execute one or more virtual appliances 450 on one or more virtual machines on a core of a multi-core processing system. In some embodiments, the server may execute one or more virtual appliances 450 on one or more virtual machines on each processor of a multiple processor device.

C. Systems and Methods for Remote Presentation of a Multimedia Data Stream

Figure 3A:
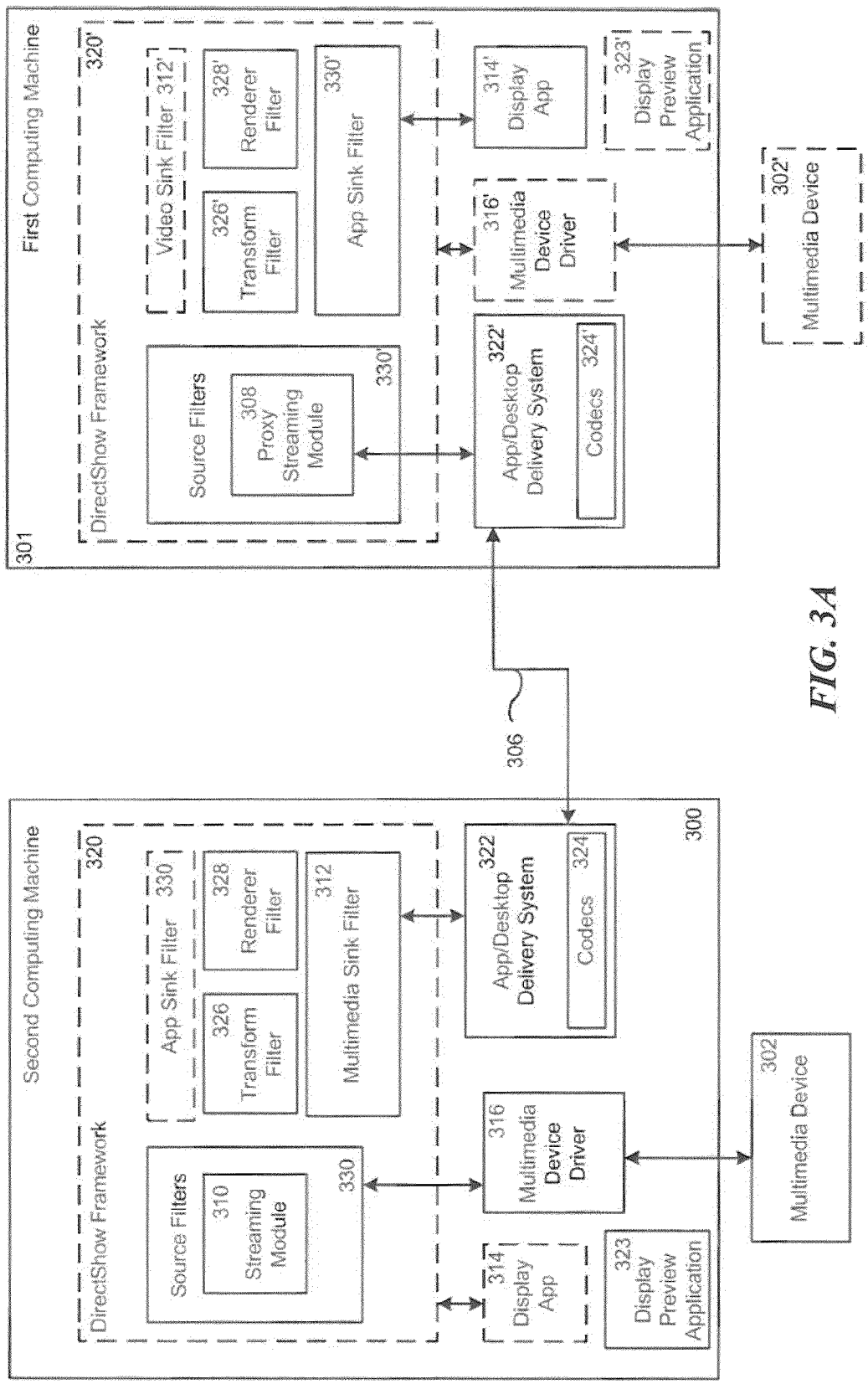
FIGS. 3A-3B illustrate block diagrams depicting embodiments of a system for remoting multimedia data for display within a remote application.

Illustrated in FIG. 3A is one embodiment of a system that retrieves multimedia data generated by a multimedia device 302, intercepts that multimedia data, and transmits the multimedia data to a remote computing machine where the data is formatted and sent to a display application 314' where the data can be displayed, played or presented to a user. The system can include two computing machines, a first computing machine 301 and a second computing machine 300, that communicate over a virtual channel 306. Each of the first computing machine 301 and the second computing machine 300 can execute a version of an application/desktop delivery system 322, 322', and the application/desktop delivery system 322, 322' can contain any number of codecs 324, 324' or other encoding libraries. Additionally, each of the first computing machine 301 and the second computing machine 300 may execute a multimedia device driver 316, 316' communicating with a multimedia device 302, 302', and each machine 301, 300 may execute a display application 314, 314'. Executing on both the first and second computing machine 301, 300 is a DIRECTSHOW Framework 320 which can comprise any of the following modules, filters and elements: source filters 330, 330' further comprising either a streaming module 310 or a proxy streaming module 308; an application sink filter 330, 330'; a multimedia sink filter 312, 312'; a transform filter 326, 326'; and a renderer filter 328, 328'. In some embodiments, either or both of the first computing machine 301 and the second computing machine 300 can execute a display preview application 323, 323'.

Multimedia data generated by a multimedia capture device may include any audio and/or video data or format. Multimedia data may include any type and form of graphical presentation. Multimedia data may include portions of audio and/or video. Multimedia data may include digital video data made up of frames or images. Multimedia data may include a key frame, such as a self-contained frame or an encoded frame without any reference to other images. In the MPEG standard, these may include I-frames and D-frames as opposed to P-frames and B-frames that require information of the previous frames, or both the previous and the following frames for encoding and decoding, respectively.

Sometimes, instead of the DIRECTSHOW framework there may be other multimedia framework executing on the first and second computing machines, such as the DirectX Media Object (DMO) and/or Windows Media Foundation (WMF). The framework, such as DIRECTSHOW may include Extensible Core Microsoft Media Technology and may include a streaming architecture designed for audio and video data which offers a high-level application model enabling rapid development of digital media applications. Such framework may also include a low-level plug-in model that enables third parties to create custom audio or video processing components. It may include features, such as DirectDraw and DirectSound of Microsoft Corporation.

Further referring to FIG. 3A, and in more detail, in one embodiment the system can comprise a first computing machine 301 and a second computing machine 300. The first computing machine 301, in some embodiments, can be any computing machine, computing machine or computer. The second computing machine 300, in some embodiments, can be any computing machine, computing machine or computer. Both the first computing machine 301 and the second computing machine 300 can be any computer, computing machine, or device described herein. In one embodiment, the first computing machine 301 is a server, while the second computing machine 300 is a client. In another embodiment, the first computing machine 301 is a client, while the second computing machine 300 is a server. In still another embodiment, the first computing machine 301 and the second computing machine 300 are clients. In one embodiment, the first computing machine 301 and the second computing machine

300 are clients that communicate via one or more proxy machines. The proxy machines, in this embodiment, can be a device, a client or a server.

While FIG. 3A depicts a single first computing machine 301, in some embodiments the first computing machine 301 is a server farm comprising a plurality of servers. In this embodiment, the first computing machine 301 is symbolic for any server within the server farm. Further, the first computing machine 301 can be symbolic of any server-farm server designated to communicate with the second computing machine 300 or with a user accessing the server farm via the second computing machine 300.

In one embodiment, each of the first computing machine 301 and the second computing machine 300 execute an application/desktop delivery system 322, 322'. This delivery system 322, 322' can be any program, module, client, process, or service that, when executing on a computing machine, obtains graphical and non-graphical data and transmits that data to a remote computing machine via a virtual channel 306 established between the computing machine on which the delivery system 322, 322' executes and the remote computing machine. In one embodiment, the application/desktop delivery system 322, 322' obtains application output data from applications executing on a local processor, and transmits that application output data to a remote computing machine. In other embodiments, the application/desktop delivery system 322, 322' obtains desktop output data from desktops executing on a local processor and transmits that desktop output data to a remote computing machine. In still other embodiments, the application/desktop delivery system 322, 322' obtains application or desktop output data from a virtual machine executing on a local processor and transmits that output to a remote computing machine.

In one embodiment, the application/desktop delivery system 322, 322' can comprise any number of codecs 324, 324' which can be used by the application/desktop delivery system 322, 322' to encode or decode multimedia. Encoding or decoding multimedia data can, in some embodiments, include compressing or decompressing multimedia data. In other embodiments, encoding or decoding multimedia data can include encrypting or decrypting multimedia data. Any of the following codecs can be used to encode and decode video data included in a multimedia data stream: Theora; MPEG-4 ASP; VC-1; VC-3; TruDef; Windows Media Video; RealVideo; Apple ProRes 422; Pixlet; MPEG-1; MPEG-2; Cineform; CorePNG; Zip Motion Block Video; DivX Video; JPEG 2000; or any other video codec. Any of the following codecs can be used to encode and decode audio data included in a multimedia data stream: Apple Lossless Audio Codec; Direct Stream Transfer; Dolby TrueHD; RealAudio; Wav-Pack; Windows Media Audio 9 Lossless; Dolby Digital; ADX; MPEG Audio; Windows Media Audio; or any other audio codec. Any of the following codecs can be used to encode and decode textual data included in a multimedia data stream: BiM; MPEG-4 Part 17; Ogg Writ; and any other text codec. In some embodiments the codecs can compress using a lossy compression algorithm, while in other embodiments the codecs can compress using a lossless compression algorithm. When multimedia data is transferred from a local computing machine to a remote computing machine, in some embodiments, the codecs used to encode the multimedia data are bundled together with the encoded multimedia data and sent to the remote computing machine. In turn, the remote computing machine can use the received codecs to decode the encoded multimedia data. In still other embodiments, the codecs 324, 324' can use any encryption algorithm to encrypt the data prior to transmitting the data. Similarly, codecs 324, 324' can be used to decrypt encrypted data.

The application/desktop delivery system 322, 322' can transmit presentation level protocol data from one computing machine to another over a virtual channel 306. The virtual channel 306, in one embodiment, can be a secure communicative connection between two or more computing machines. This virtual channel 306 can be established over a network such as any of the networks described herein, and often transmits data via a presentation level protocol such as the CITRIX ICA protocol, or any other presentation level protocol described herein. In some embodiments, the application/desktop delivery system 322, 322' further comprises a module that encapsulates formatted multimedia data to form presentation level protocol data. When a remote machine receives the encapsulated multimedia data, the remote machine can un-encapsulate or deconstruct the multimedia data in order to retrieve the multimedia data for processing. In many embodiments, the application/desktop delivery system 322, 322' establishes the virtual channel 306 when a local computing machine requests access to an application executing on a remote computing machine. Establishing the virtual channel 306 can include any of the following actions: authenticating a user issuing a request to access an application executing on a remote computing machine; verifying privileges associated with the user or the computing machine used by the user to issue the access request; establishing a secure connection between one or more computing machines; and connecting the user to a profile of the user stored on the remote computing machine or stored on a computer accessible by the remote computing machine.

In one embodiment, the second computing machine 300 can be connected to a multimedia device 302, while the first computing machine 301 is not connected to a multimedia device 302. In other embodiments, the first computing machine 301 can be connected to a multimedia device 302' while the second computing machine 300 is not connected to a multimedia device 302. In still other embodiments, each of the first computing machine 301 and the second computing machine 300 are connected to different multimedia devices 302. While FIG. 3A illustrates a single multimedia device 302, 302', either computing machine can be connected to multiple multimedia devices. The multimedia device(s) 302, 302' can be any of the following multimedia devices: web camera; microphone; projector; smart phone; DVD player; CD player; television tuner; musical instrument digital interface; MP3 player; digital cable interface; camera; video camera; infrared camera; optical input device; keyboard; mouse; Blu-Ray Player; satellite interface device; and any other multimedia device.

The multimedia device 302, 302', in some embodiments, interfaces with a multimedia driver 316, 316' on the computing machine. The multimedia driver 316, 316' receives raw multimedia output generated by the multimedia device 302, 302' and converts the raw output to a format able to be processed by the DIRECTSHOW framework 320, 320' or by any other application for formatting and processing multimedia data. The multimedia driver 316, 316' can interface with the DIRECTSHOW framework 320, 320', the display application 314, 314' or any other application that can input formatted multimedia output in its native form and process the output for eventual presentation to a user. The multimedia data can be any one of the following data: video; audio; text; graphical; or any other type of multimedia data.

While FIG. 3A illustrates a first computing machine 301 and a second computing machine 300 where each computing machine can execute a multimedia device driver 316, 316'. In some embodiments, the computing machine 300, 301 connected to a multimedia device 302, 302' can include a multimedia device driver 316, 316', while the other computing machine that is not connected to the multimedia device 302, 302' does not include a multimedia device driver 316, 316'. Thus, a multimedia driver 316, 316', in some embodiments, is not needed by a computing machine 300, 301 unless that computing machine 300, 301 communicates directly with a multimedia device 302, 302'. For example, in an embodiment where the second computing machine 300 communicates directly with a multimedia device 302 to obtain multimedia data from the multimedia device 302, the second computing machine 300 can include a multimedia device driver 316. Upon obtaining the multimedia data from the multimedia device 302 via the multimedia device driver 316, the second computing machine 300 can transmit the multimedia data to a first computing machine 301 over a virtual channel 306. In this embodiment, the first computing machine 301 does not communicate with a multimedia device 302, therefore the first computing machine 301 does not include a multimedia device driver 316. The first computing machine 301, in this embodiment, does not require a multimedia device driver 316 in order to receive and process the multimedia data transferred to the machine 301 from the second computing machine 300.

The display application 314, 314' can be any application able to display, play or otherwise present multimedia. In some embodiments, the display application 314 can execute on the first computing machine 301, and not on the second computing machine 300. In other embodiments, the display application 314' can execute on the second computing machine 300 and not on the first computing machine 301. The system compensates for the lack of a display application on one of the computing machines, therefore in many embodiments, at least one computing machine within the system does not have an instance of the display application and therefore cannot execute the display application 314. The display application 314, 314' can by any of the following display applications: Microsoft Communicator; Skype; Windows Media Player; AOL Instant Messenger; Google Chat; RealPlayer; QuickTime; Adobe Media Player; DivX Video Player; Gmail Voice and Video Chat; iVideoChat; Camfrog; TokBox; NetMeeting; Yahoo Messenger; and any other multimedia player. In some embodiments, the display application is a multimedia player for playing audio such as Windows Media Player, iTunes, or any other audio player. In other embodiments, the display application is a video or web conference system able to replay audio, video and text. In still other embodiments, the display application 314, 314' is an application for displaying web camera data, or an application for facilitating web chats. The display application 314, 314', in still another embodiment, is an application for displaying video or a combination of video and audio.

In some embodiments, either or both of the first computing machine 301 and the second computing machine 300 can execute a display preview application 323, 323'. In one embodiment, the display preview application 323, 323' can be a stand-alone application, while in other embodiments the display preview application 323, 323' can be included in the display application 314. In other embodiments, the display preview application 323, 323' can be included within the application/desktop delivery system 322. The display preview application 323, 323' receives multimedia data processed within the framework 320, 320' and locally displays the multimedia data within an application output window. In some embodiments, the display preview application 323, 323' can communicate with the application/desktop delivery system 322, 322' on the remote computing machine to receive control information about the presentation window. Control information can include: parent application window properties; application window size and position; in-remote session clipping, or any other control information used by the presentation window to display the multimedia data. In some embodiments, the parent application or remote presentation application is a display application 314, 314' executing on a computing machine located remote from the computing machine receiving the multimedia data. One example of local preview via the display preview application 323, 323' includes a second computing machine 300 receiving multimedia data from a multimedia device 302. The second computing machine 300 receives an instruction to display the multimedia data in a remote application executing on a first computing machine 301. Rather than transmit the multimedia data to the first computing machine 301, the display preview application 323 queries the application/desktop delivery system 321' executing on the first computing machine 301 for control information about the remote display application 314'. The application/desktop delivery system 312' can then retrieve this information from an operating system executing on the first computing machine 301 and transmit the relevant control information to the display preview application 323 executing on the second computing machine 300. The display preview application 323 can then use the control information to generate an application output window for displaying the received multimedia data.

Each of the first computing machine 301 and the second computing machine 300 execute an instance of the DIRECTSHOW framework 320, 320'. In other embodiments, the framework can be a framework based on either of the following technologies DIRECTX MEDIA OBJECT (DMO), MEDIA FOUNDATION (MJ) or any other multimedia technology suitable for the methods and systems described herein. In some embodiments, the first computing machine can execute a first framework 320' based on a first type of multimedia technology, while the second computing machine can execute a second framework 320 based on a second type of multimedia technology. For example the first computing machine can execute a DIRECTSHOW framework 320' while the second computing machine can execute a framework 320 based on DMO multimedia technology. In another example, the first computing machine can execute a framework 320' based on MJ multimedia technology, while the second computing machine can execute a framework 320 based on DMO multimedia technology.

The DIRECTSHOW framework 320, 320', in many embodiments, is a software development kit or application program interface that can be used to format, modify and manipulate multimedia data and more specifically, multimedia data streams. In some embodiments, the DIRECTSHOW framework 320, 320' can be used to perform operations on multimedia data inputted by a source filter 330, 330'. Filters, modules, clients or programs included within the framework can receive raw data, format the raw data, modify the raw data and perform other complex processing operations on inputted data. In some embodiments, the processing operations are performed within the DIRECTSHOW framework 320. Outside applications can interface with data inputted and manipulated within the DIRECTSHOW framework via communication interfaces included within the DIRECTSHOW framework 320, 320'. These communication interfaces, in some embodiments, can use COM technology developed by Microsoft. In other embodiments, the communication interfaces can be any communication interface able to relay information from modules, filters, clients or other programs executing within the DIRECTSHOW framework 320, 320' to programs interfacing with the framework 320, 320'.

In one embodiment, the DIRECTSHOW framework 320, 320' executes source filters 330, 330' which can retrieve information from multimedia driver(s) 316, 316' and forward that information on to other filters and modules executing within the framework 320, 320'. In some embodiments, the source filters are modules, clients or programs executing on a computing machine and within the framework 320, 320'. In other embodiments, the source filters are services and processes executed by a processor and executed by a processor within the kernel space of a computing machine. The source filters 330, 330', in some embodiments, stream data from any of the following sources: a driver; a device interface; a device; a communication module; a virtual channel 306; a network; a memory repository; or any other information source. In many embodiments, the source filters 330, 330' stream the multimedia data from a source at the kernel level rather than at the user level. In other embodiments, the source filters 330, 330' can stream data at the user or program level. Data streamed by the source filters 330, 330' is often forwarded to additional modules, programs, clients or filters executing within the framework 320, 320'. Just as the source filter 330, 330' streams the multimedia data from a driver or other source, the source filter 330, 330' can also stream the multimedia data to additional modules, clients, filters and programs executing within the framework 320, 320'.

The source filters 330, 330' can comprise a single source filter, or can comprise multiple filters. These source filters 330, 330' can be associated with a specific multimedia device, or can be associated with a specific multimedia data type, i.e. video, audio, text. In one embodiment, the source filters 330, 330' can comprise a streaming module 310 for streaming multimedia content from a source such as a multimedia device driver 316. The streaming module 310, in some embodiments can be the KSProxy filter included within the DIRECTSHOW framework 320, 320'. When the streaming module 310 is the KSProxy filter or a module, filter or program having substantially the same functionality as the KSProxy filter, the streaming module 310 will stream multimedia data from a source such as a driver, device interface or other interface or communication port able to relay multimedia data to a program executing within the framework 320, 320'. In one embodiment, the streaming module 310 is included in the instance of the framework 320, 320' installed on the computing machine connected to or in direct communication with the multimedia device 302, just as FIG. 3A depicts the framework 320 on the second computing machine 300 as comprising a streaming module 310. In embodiments that include a framework 320, 320' or application interface that is not DIRECTSHOW, the streaming module 310 can be any program able to retrieve raw, un-formatted multimedia data either from a multimedia device or from a driver or other interface communicating with the multimedia device.

In one embodiment, the source filters 330, 330' can comprise a proxy streaming module 308 that corresponds to a streaming module 310 on a remote computing machine. For example, the proxy streaming module 308 executing within the instance of the DIRECTSHOW framework 320' executing on the first computing machine 301 corresponds to the streaming module 310 executing within the instance of the DIRECTSHOW framework 320 executing on the second computing machine 300. The proxy streaming module 308, however, streams multimedia data from one of either a network 104, a virtual channel 306 such as the virtual channel 306 between the first computing machine 301 and the second computing machine 300 and any other multimedia source.

The proxy streaming module 308, in some embodiments streams the multimedia data from a virtual channel 306 by streaming the multimedia data from a temporary memory repository or cache on the computing machine. The application/desktop delivery system 322 or a program communicating with the application/desktop delivery system 322 stores the multimedia data into the temporary memory repository or cache after the application/desktop delivery system 322 receives the multimedia data from the remote computing machine, i.e. the second computing machine 300. In other embodiments, the proxy streaming module 308 opens or otherwise establishes a channel within the virtual channel 306, and streams multimedia data directly from the remote computing machine, i.e. the second computing machine 300, over the established channel.

Other filters included within the framework 320 are the transform filter 326, 326' and the renderer filter 328, 328'. The transform filter 326, 326', in some embodiments, can input raw or formatted multimedia data and further manipulate, modify or transform the inputted data. For example, the transform filter 326, 326' can input multiple video streams and splice those streams together according to a combination scheme or according to user instructions. In another embodiment, the transform filter 326, 326' can input an audio stream and a video stream, synchronize the streams according to timestamp information included within each stream, and combine the streams into a single multimedia data stream. In yet another embodiment, the transform filter 326, 326' can place text within video or perform other similar modifications to the inputted data stream.

The renderer filter 328, 328', in some embodiments, can render the multimedia streams. In one embodiment, the renderer filter 328, 328' can input an audio stream, and format the audio stream as needed before forwarding the audio stream to a sound card within the local computing machine. The renderer filter 328, 328' in other embodiments can forward the audio stream to an audio player such as iTunes or Windows Media Player. In another embodiment, the renderer filter 328, 328' can input a video stream, and format the video stream as needed before forwarding the video stream to a video card within the local computing machine. The renderer filter 328, 328', in other embodiments, can forward the video stream to a video player such as iVideo or Windows Media Player. In yet another embodiment, the renderer filter 328, 328' can draw received video to a screen, draw received graphics to a screen, draw received text to a screen, or write received multimedia data to a memory element.

In some embodiments, the DIRECTSHOW framework 320, 320' can comprise an application sink filter 330, 330' which can be used to stream formatted multimedia data from the DIRECTSHOW framework 320, 320' to a display application 314, 314'. In one embodiment, there can exist an application sink filter 330, 330' for each possible display application. In other embodiments, the application sink filter 330, 330' forwards the multimedia data stream according to a file type or according to a configuration setting. In frameworks that use a multimedia technology different from the DIRECTSHOW framework, a renderer filter 328 can be referred to as a sink filter. Thus, in the DIRECTSHOW framework, the application sink filter 330, 330' can be called the application renderer filter 330, 330'.

In other embodiments, the DIRECTSHOW framework 320, 320' can comprise a multimedia sink filter 312, 312' which can be used to receive the streamed multimedia data generated by the multimedia device 302 and transmit the streamed multimedia data over the virtual channel 306 to the remote computing machine, e.g. the first computing machine 301. The multimedia sink filter 312, 312', in some embodiments, can be a video/audio sink filter 312, 312' that receives, processes and transmits both video and audio data. In other embodiments, the multimedia sink filter 312, 312' can be a camera/microphone sink filter 312, 312'. In one embodiment, the video/audio sink filter 312, 312' can be a type of renderer filter 328. In frameworks that use a multimedia technology different from the DIRECTSHOW framework, a renderer filter 328 can be referred to as a sink filter. Thus, in the DIRECTSHOW framework, the video/audio sink filter 312, 312' can be called the video/audio renderer filter 312, 312'.

Figure 3B:
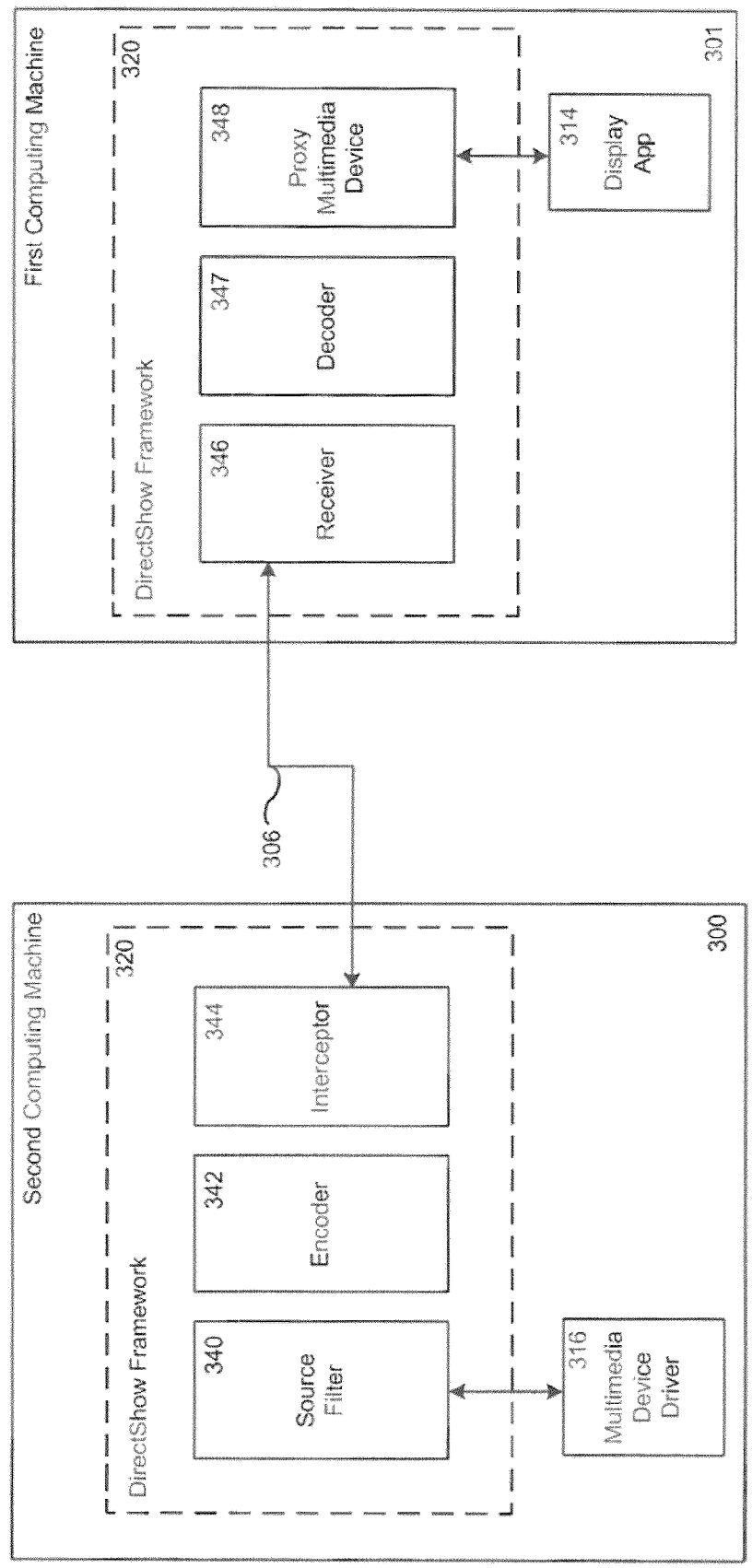

While FIG. 3B illustrates a single multimedia device 302, 302', in other embodiments the computing machines 300, 301 can communicate with multiple multimedia devices. Similarly, the multimedia data stream received by the streaming module 310 and streamed from the virtual channel 306 by the proxy streaming module 308 can include one or more data streams originating from one or more multimedia devices. For example, the multimedia data stream can include data generated by two different cameras. The streaming module 310 can stream data from both cameras and the remoting application or application/desktop delivery system 322, 322' can stream both camera data streams over the virtual channel 306. The proxy streaming module 308 can then stream from the virtual channel 306 a single multimedia data stream that includes both the first and second camera data stream.

Illustrated in FIG. 3B is an embodiment of the system 303 illustrating another scheme for the DIRECTSHOW framework 320, 320'. In one embodiment, the instance of the framework 320 executing on the second computing machine 300 comprises a KSProxy filter 340, an encoder 342 and an interceptor 344. The multimedia information/data obtained or received by the multimedia driver 316 executing on the second computing machine 300, is streamed to the KSProxy filter 340 at the kernel level. The interceptor 344 streams the encoded multimedia information over a virtual channel 306 installed between the first computing machine 301 and the second computing machine 300. The following components are included within the DIRECTSHOW framework 320' on the first computing machine 301, a receiver 346, a decoder 347 and a proxy multimedia device 348. The proxy multimedia device 348 can communicate with a display application 314 executing on the first computing machine 301.

Further referring to FIG. 3B, and in more detail, in one embodiment the KSProxy filter 340 functions substantially the same as the streaming module 310. The KSProxy filter 340, in many embodiments, streams multimedia data directly from the multimedia device driver 316 and streams the received multimedia data to other filters or modules included in the DIRECTSHOW framework 320. In one embodiment, the KSProxy filter 340 streams the multimedia data from the multimedia device driver 316 at the kernel level. In other embodiments, the KSProxy filter 340 streams the multimedia data from the multimedia device driver 316 at the user or application level.

The encoder 342 can be any encoder. In one embodiment, the encoder 342 can receive the multimedia data from the KSProxy filter 340 and encode the multimedia data using any codec. In particular, the encoder 342 can encode the multimedia data using any codec described herein. The type of codec used to encode the multimedia data can be based on the type of data included in the multimedia data stream. For example, a video encoding codec can be used to encode video data, while an audio encoding codec can be used to encode audio data. In many embodiments, the encoder 342 can be communicatively connected to the KSProxy filter 340 or streaming module 310 such that the encoder 342 can stream multimedia data from either the filter 340 or the module 310. In one embodiment, the encoder 342 and decoder 347 can negotiate security credentials and in some embodiments, can exchange encryption keys or other encryption agents.

The interceptor 344 can be communicatively connected to the encoder 342 such that the interceptor 344 intercepts multimedia data once it is encoded by the encoder 342.

There may be encoder/decoder negotiation involved. Such negotiation may be in accordance with ICA or RAVE virtual channel protocol. In some embodiments, the interceptor 344 can stream multimedia data directly from the KSProxy filter 340 or the streaming module 310 such that the multimedia data is not encoded by the encoder 342. In another embodiment, the interceptor 344 includes substantially the same functionality as the multimedia sink filter 312. The interceptor 344, in some embodiments, communicates with the receiver 346 using a presentation level protocol. Upon receiving the multimedia data either from the encoder 342, the KSProxy filter 340/streaming module 310 or some other filter or module; the interceptor 344 transmits or streams the multimedia data to the receiver 346. In one embodiment, the interceptor 344 encapsulates the multimedia data packets in a presentation level protocol before transmitting the multimedia data to a remote computing machine.

While FIG. 3B illustrates a framework 320 where the encoder 342 precedes the interceptor 344, in other embodiments the interceptor 344 can intercept multimedia data and forward it to an encoder 342. Thus, in this embodiment the interceptor 344 precedes the encoder 342. In other embodiments, the placement of the modules within the frameworks 320, 320' illustrated in FIG. 3B does not indicate the order in which actions occur during the process of streaming multimedia data, processing the multimedia data, intercepting the multimedia data and transmitting the multimedia data, or the process of receiving and processing multimedia data transmitted over a virtual channel 306.

The receiver 346, in some embodiments, receives multimedia data from a remote computing machine and forwards the received data to other filters, modules, clients or programs executing within the DIRECTSHOW framework 320'. In at least one embodiment, the receiver 346 can un-encapsulate multimedia data encapsulated in a presentation level protocol before streaming the multimedia data to other programs executing within the DIRECTSHOW framework 320'. In another embodiment, the receiver 346 can stream the multimedia data to a decoder 347 or directly to a proxy multimedia device 348.

The decoder 347, in some embodiments, can decode received multimedia data using the codec used to encode the multimedia data. This codec can be any codec, and more specifically, can be any codec described herein. In one embodiment, the decoder 347 can decompress, decrypt or otherwise decode the multimedia data before streaming the multimedia data to another program or component executing within the framework 320'.

The proxy multimedia device 348 can stream multimedia data from any of the filters included in the framework 320', but more specifically can stream multimedia data from either the receiver 346 or the decoder 347. In one embodiment, the proxy multimedia device 348 streams the received multimedia data directly to the display application 314 so that the display application 314 can display or present the received multimedia data. In some embodiments, the framework 320' can comprise a proxy multimedia device 348 for each display application 314. In other embodiments, the framework 320' can comprise a proxy multimedia device 348 for each type of multimedia data.

Figure 4:
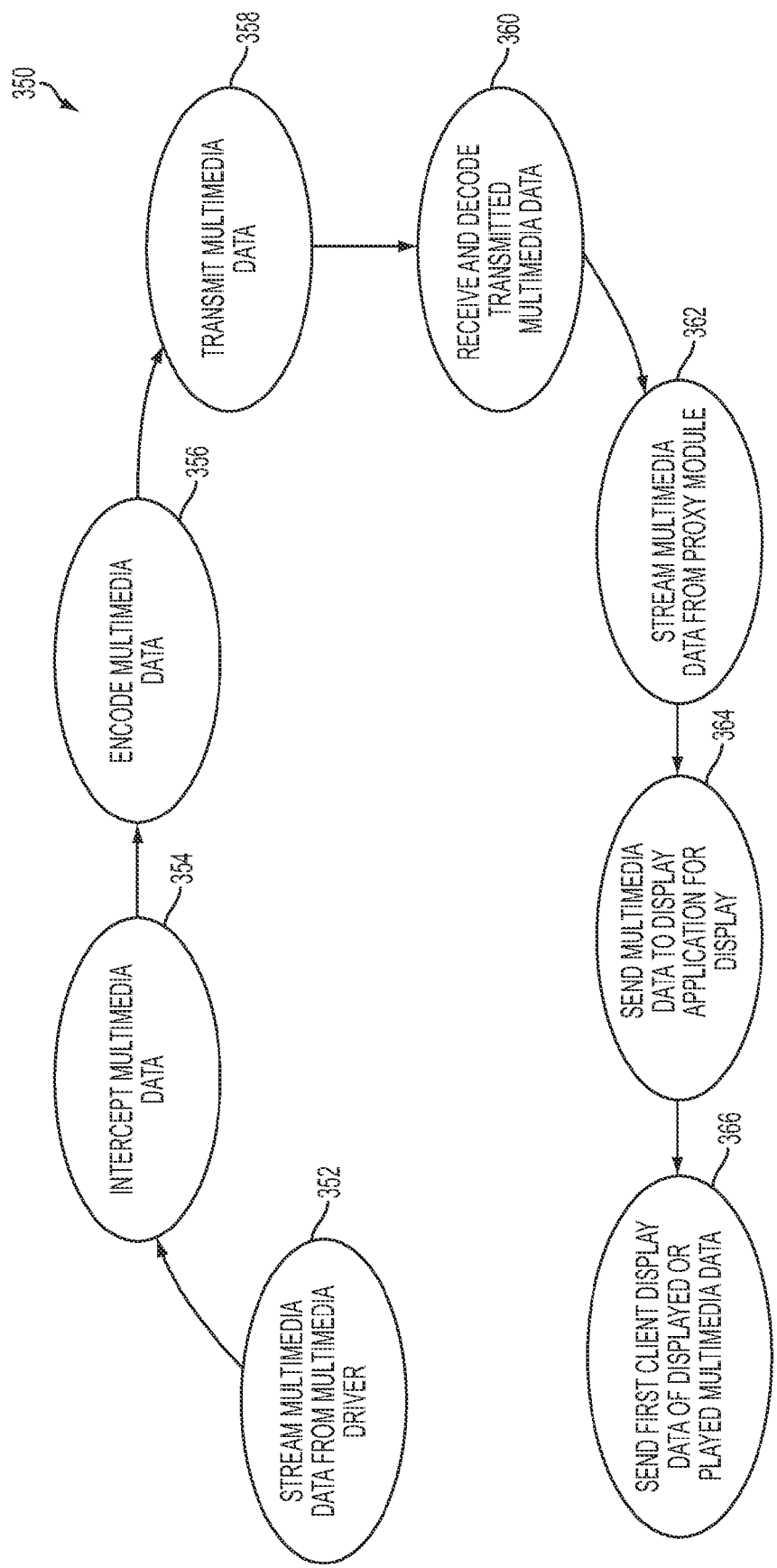
FIG. 4 illustrates a flow diagram depicting an embodiment of a process for obtaining and remoting multimedia data.

Illustrated in FIG. 4 is an embodiment of a flow diagram that depicts an embodiment of the path 350 multimedia data travels from the time it is captured by a multimedia device to the point in time that a user views or hears the multimedia data. The path or process 350 includes a streaming module 310 or KSProxy filter 340 streaming multimedia data from a multimedia driver 316, 316' that captures multimedia data generated by a multimedia device 302, 302' (Step 352). The multimedia data is then intercepted by a module within the framework 320, 320' (Step 354) and streamed to an encoder 342 or transformation filter 326 where the multimedia data is encoded using codecs 324 on the computing machine (Step 356). The encoded multimedia data is then transmitted 358 over the virtual channel 306 (Step 358) to a remote computing machine. Modules executing on the remote computing machine received the transmitted multimedia data and decode the data using codecs corresponding to those codecs used to encode the multimedia data (Step 360). A proxy module streams the multimedia data from the application that received the multimedia data (Step 362) and then transmits the multimedia data to a display application (Step 364). The display application receives the streamed multimedia data and presents the multimedia data to a user. The application/desktop delivery application can then capture the presented data and send it back to the second computing machine 300 (Step 366).

Further referring to FIG. 4, and in more detail, in one embodiment a streaming module 310 or KSProxy filter 340 streams multimedia data from a multimedia driver 316, 316' that captures multimedia data generated by a multimedia device 302, 302'. In some embodiments, the streaming module 310 is a KSProxy filter 340, while in other embodiments the streaming module is any application that can stream multimedia data directly from a multimedia driver 316, 316'. The streaming module 310, in some embodiments, executes at the kernel level. In other embodiments, the streaming module 301 can execute at the user level.

In one embodiment, a module executing within the DIRECTSHOW framework 320, 320' intercepts the multimedia data generated by the multimedia device 302, 302' (Step 354). In some embodiments, this module can be a streaming module 310 executing on a computing machine. In other embodiments, this module can be a proxy streaming module 308 executing on a computing machine. The module, in some embodiments, can intercept the multimedia data by streaming the multimedia data directly from a device driver 316, 316'. In other embodiments, the module can intercept the multimedia data by streaming the data from an intermediary or intermediate application communicating with the device driver 316, 316'.

In still other embodiments, an encoder 342 or transformation filter 326 encodes the multimedia data (Step 356) prior to transmission. Encoding can include compressing, transforming or otherwise encrypting the multimedia data. In some embodiments, the encoder 342 or transformation filter 326 can encode the multimedia data using any encoding scheme. In other embodiments, the encoder 342 or transformation filter 326 can encode the multimedia data using any encryption algorithm, compressing algorithm or encoding algorithm described herein. While FIG. 4 illustrates a process 350 that includes encoding the multimedia data stream, in some embodiments, the process 350 does not include an encoding step during which an encoder encodes the multimedia data.

The computing machine, in some embodiments, can then transmit the encoded multimedia data over the virtual channel 306 to a remote computing machine (Step 358). In one embodiment, the application/desktop delivery system 322 transmits the encoded multimedia data over the virtual channel 306. In other embodiments, the multimedia data is transmitted over a virtual channel 306 dedicated to a user of the computing machine.

In some embodiments, modules executing on the remote computing machine receive the transmitted multimedia data and decode the data using codecs corresponding to those codecs used to encode the multimedia data (Step 360). The codecs, in some embodiments, can be transmitted along with the multimedia data. In other embodiments, the remote computing machine can request the codecs from the local computing machine. Upon receiving the codecs, a decoder or other decoding application can decode the encoded multimedia data. While FIG. 4 illustrates a process 350 whereby the multimedia data is decoded, in some embodiments the multimedia data is not encoded and therefore need not be decoded.

Once the remote computing machine receives the multimedia data, in some embodiments a streaming module 310 or proxy streaming module 308 streams the multimedia data from the receiving application (Step 362). In some embodiments, the proxy streaming module 308 streams the multimedia data from the application/desktop delivery system 322'. In other embodiments, the streaming module 310 streams the multimedia data from the application/desktop delivery system 322. When the streaming module 310 or proxy streaming module 308 streams the multimedia data from the application that received the multimedia data, the module 310, 308 can stream the multimedia data into the DIRECTSHOW framework 320, 320'. In some embodiments, the multimedia data can be further processed by filters or applications executing within the framework 320, 320' subsequent to streaming the multimedia data into the framework 320, 320'.

In one embodiment, the proxy streaming module 308 can forward the multimedia display to a display application for display (Step 364). A display application, in some embodiments, can be any display application able to display, play or present multimedia data. In other embodiments, a display application can be any display application described herein. Forwarding the multimedia data to the display application can include streaming, transmitting or otherwise sending the display data to the display application. In some embodiments, forwarding the multimedia data can include formatting the multimedia data using one or more filters included in the DIRECTSHOW framework 320, 320'. In other embodiments, forwarding the multimedia data can include formatting the multimedia data according to one or more filters of the display application.

In one embodiment, the display application displays, plays or presents the multimedia data upon receiving it from the proxy streaming module 308. The display application, in other embodiments, can display and/or present the multimedia data on a display device communicating with the computing machine on which the display application executes. In other embodiments, the display application plays the multimedia data on speakers communicating with the computing machine on which the display application executes.

A remoting application, in some embodiments, intercepts the application output generated by the display application, and sends the display data of the displayed or played multimedia data to a second computing machine or client (Step 366). Intercepting the application output can include intercepting graphics generated by the display application, audio data generated by the display application, and or video generated by the display application. In some embodiments, the remoting application is a remote access client such as XEN APPLICATION, OR XEN DESKTOP manufactured by CITRX SYSTEMS, INC. In other embodiments, the remoting application can be any client that uses a presentation level protocol to intercept application output and transmit that output to remote computers or devices.

Figure 5A:
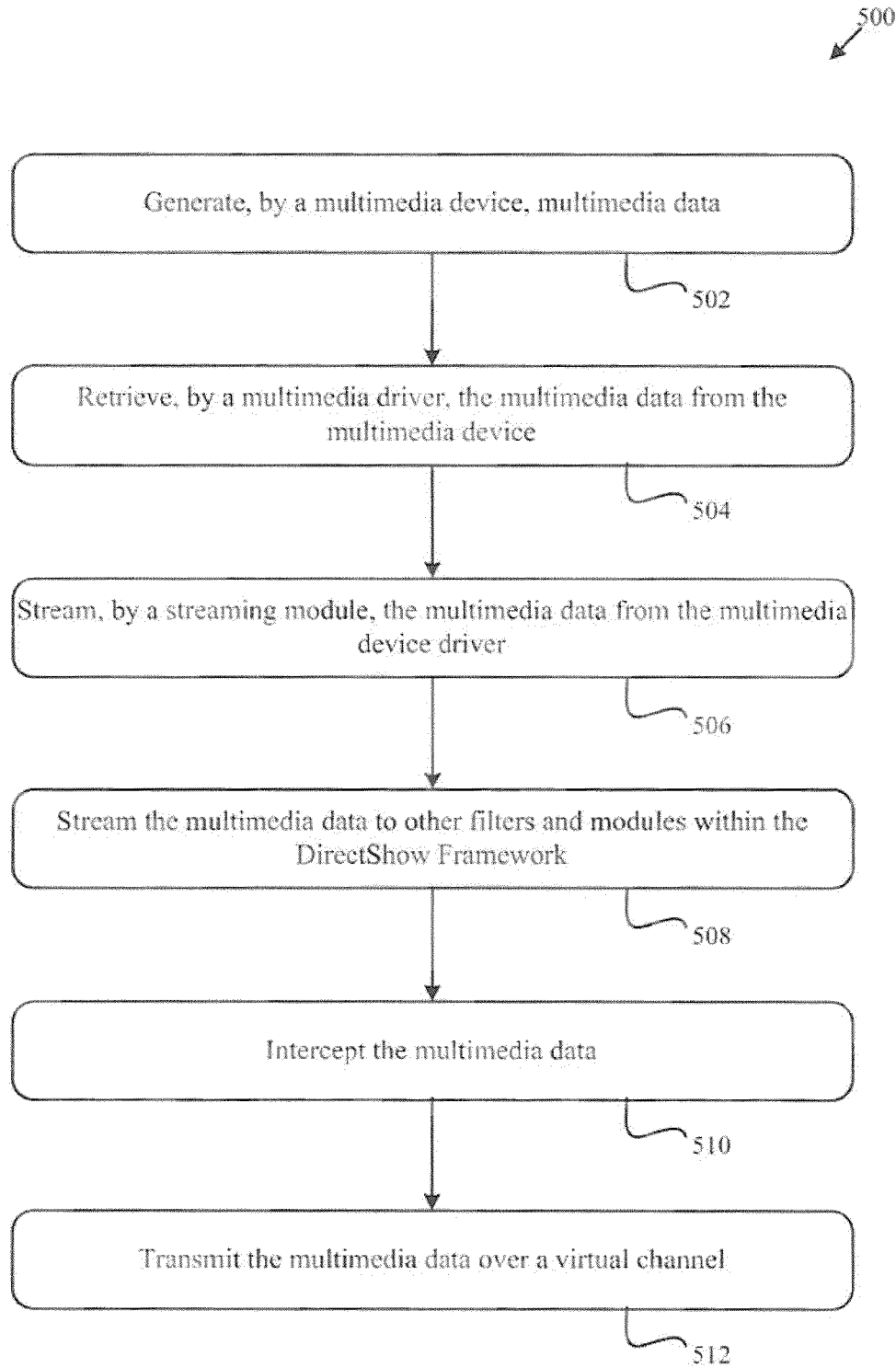
FIG. 5A illustrates a flow diagram depicting an embodiment of a method for obtaining and transmitting multimedia data.

Illustrated in FIG. 5A is one embodiment of a method 500 for remotely presenting multimedia output. In one embodiment, a multimedia device 302, 302' generates multimedia data (Step 502) and a multimedia device driver 316, 316' retrieves or receives the multimedia data from the multimedia device (Step 504). A streaming module 310 executing on a computing machine streams or passes the multimedia data from the multimedia device driver 316 (Step 506) to one or more filers and/or modules executing within a DIRECT-SHOW framework 320, 320' (Step 508). An application/desktop delivery system 322, 322' or remoting application then intercepts the multimedia data (Step 510) and transmits the multimedia data over a virtual channel 306 (Step 512).

Further referring to FIG. 5A, and in more detail, in one embodiment a multimedia device 302, 302' generates multimedia data (Step 502). The multimedia device 302, 302' can be any multimedia device, while in some embodiments the multimedia device 302, 302' can be any multimedia device described herein. In some embodiments, the multimedia device 302, 302' can be connected to or communicating with a second computing machine 300. In other embodiments, the multimedia device 302, 302' can be connected to a first computing machine 301, or any other computing machine or computing machine. In some embodiments, the multimedia device 302, 302' generates multimedia data by recording video, graphics or audio. For example, the multimedia device 302, 302' can be a video or web camera that can capture an image of a scene over a period of time. Capturing the scene can include generating a video and/or an audio representation of events that occur within the scene during a period of time. The period of time, in some embodiments, is a period of time the device 302, 302' is set to record the events that occur within the scene. The scene, in some embodiments, can be an area able to be viewed or heard by a lens and/or a microphone of the device 302, 302'. Thus, the device 302, 302' can record the movements and speech of a person who talks in front of the device's lens and microphone.

In some embodiments, a multimedia device driver 316, 316' executing on the computing machine can retrieve the multimedia data from the multimedia device 302, 302'(Step 504). Retrieving the multimedia data, in some embodiments, can include receiving data transmitted by the multimedia device 302, 302' to the device driver 316, 316'. For example, the multimedia device 302, 302' can generate multimedia data and substantially at the same time transmit that multimedia data over a connection between the device 302, 302' and the computing machine, to the computing machine. In some embodiments, the multimedia device driver 316, 316' can receive the raw output from the multimedia device 302, 302' and translate it into commands able to be to interpreted by the operating system, the DIRECTSHOW Framework 320, 320' and other applications executing on the computing machine. In other embodiments, the multimedia device 302, 302' can transmit, stream or otherwise send generated multimedia data to the computing machine where the multimedia data is stored in memory. The multimedia device driver 316, 316' can then retrieve the multimedia data from the memory element.

A streaming module 310 executing on the computing machine can, in some embodiments, stream the multimedia data from the multimedia device driver 316, 316' (Step 506). While FIG. 5A illustrates a method 500 where the streaming module 310 streams data from the multimedia device driver 316, 316', in some embodiments the streaming module 310 can stream the multimedia data directly from the multimedia device 302, 302'. In other embodiments, the streaming module 310 can stream the multimedia data from the driver 316, 316' at the kernel level rather than at the user level. The streaming module 310, in many embodiments, executes within the DIRECTSHOW Framework 320, 320' on the computing machine. Thus, the streaming module 310 can stream multimedia data from the multimedia device driver 316, 316' into the framework 320, 320'.

In some embodiments, the streaming module 310 streams the multimedia data to other filters or modules executing within the DIRECTSHOW Framework 320, 320' (Step 508). Streaming the multimedia data to the filters and modules can include passing, transmitting or otherwise sending the multimedia data to the filters and modules. In some embodiments, the streaming module 310 can stream the multimedia data to a filter or module in response to a request from a filter or module for the multimedia data. In one embodiment, the streaming module 310 can stream the multimedia data from the multimedia device driver 316 to any transform filter 326, 326', renderer filter 328, 328', and/or video/application sink filter. The streaming module 310, in some embodiments, in a source filter 330 such that the streaming module 310 streams multimedia data from the multimedia device driver 316, 316' and provides the streamed multimedia data to any filter or module that wants or tries to access the multimedia data. In some embodiments, the streaming module 310 streams the multimedia data to filters and modules executing in the framework 320, 320' and associated with the display application 314, 314'.

A remoting application, in some embodiments, can intercept the multimedia data at any time after it is streamed from the multimedia device 302, 302' (Step 510). In some embodiments, the remoting application can be any remoting application described herein. In other embodiments, the remoting application can be the application/desktop delivery system 332. In still other embodiments, the remoting application can be any application, thin client or program that executes on the computing machine and that uses a presentation level protocol to transmit application data to a remote computing machine. Intercepting the multimedia data, in some embodiments, can include hooking into the DIRECTSHOW Framework 320, 320' so that any calls made to a local presentation or display application can be intercepted by the remoting application. Upon intercepting or receiving the calls, the remoting application can extract the multimedia data included in the call and transmit the multimedia data to a remote computing machine. In some embodiments, the remoting application can be a module or program that executes within an application/desktop delivery system 322, 322'. The module or program can register as a display application such that each time multimedia data is processed by the DIRECTSHOW Framework 320, 320', the module or program receives the processed multimedia data instead of other display applications executing on the computing machine. In this embodiment, the remoting application can receive or capture the multimedia data.

The remoting application, in some embodiments, transmits the multimedia data over a virtual channel 306 to a remote computing machine (Step 512). In some embodiments, the remoting application can encapsulate or modify the multimedia data using a remote presentation protocol tailored towards transmitting multimedia data. Upon encapsulating the multimedia data using this protocol, the delivery system 322, 322' can then transmit the encapsulated data to a remote computing machine. While FIG. 5A illustrates a method 500 where the multimedia data is transmitted to one remote computing machine, in some embodiments, the multimedia data can be transmitted to one or more remote computing machines communicating with the computing machine via a virtual channel 306.

In some embodiments, the method 500 can further include a step of locally display the captured or intercepted multimedia data. Subsequent to intercepting the multimedia data, the display preview application 323, 323' executing on the second computing machine 300 can receive and process the multimedia data. Instead of transmitting the multimedia data over a virtual channel 306 (Step 512), the display preview application 323, 323' can query the This display preview application 323, 323' can query a remote computing machine for control information related to a display application, and using this information the display preview application 323, 323' can generate an application output window. The display preview application 323, 323' can then display the multimedia data in the application output window. Displaying the multimedia data can also include playing audio data included in the multimedia data.

In one embodiment, the remoting application or any application or program executing on a computing machine to transmit the intercepted multimedia data over a virtual channel (Step 512) can perform one or more quality control operations. In some embodiments, a quality control operation can include determining an amount of available bandwidth on the virtual channel 306, and varying the transmission rate according to the determined bandwidth. For example, when there is a low amount of available bandwidth, the program may transmit multimedia data over the virtual channel 306 at a slower rate in order to achieve optimal throughput and maximum quality. In other embodiments, a quality control operation can include sending a command to a streaming module 310, video filter 312 or any other program to sample the multimedia data from the multimedia device 302 at a slower rate. In one embodiment, this command can include data indicating an amount of available bandwidth. In other embodiments, this command can include a sample rate determined based on an amount of available bandwidth.

Figure 5B:
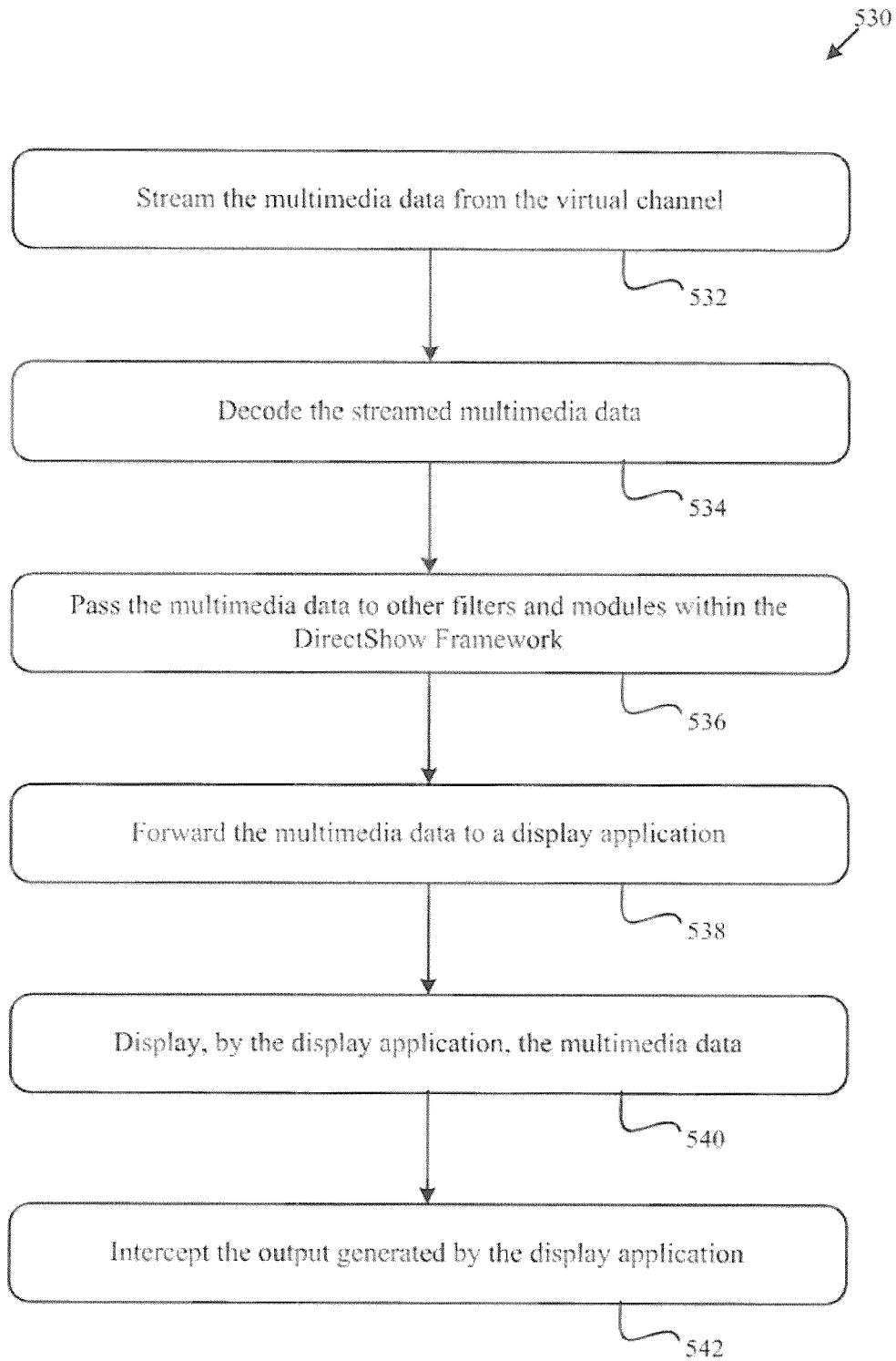
FIG. 5B illustrates a flow diagram depicting an embodiment of a method for retrieving and displaying multimedia data.

Illustrated in FIG. 5B is an embodiment of a method 530 for receiving remotely provided multimedia data, and processing that multimedia data. In one embodiment, a proxy streaming module 308 executing within the DIRECTSHOW Framework 320, 320' of a remote computing machine streams multimedia data from a virtual channel 306 (Step 532) and decodes the streamed multimedia data (Step 534). The proxy streaming module 308 then passes the multimedia data to other filters and modules within the DIRECTSHOW Framework 320, 320' (Step 536). A filter or module within the DIRECTSHOW Framework 320, 320' then forwards the multimedia data to a display application 314, 314' (Step 538) which displays the multimedia data (Step 540). In some embodiments, a remoting application executing on the remote computing machine intercepts the output generated by the display application (Step 542).

Further referring to FIG. 5B, and in more detail, in one embodiment a proxy streaming module 308 streams multimedia data from the virtual channel 306 (Step 532). In some embodiments, the proxy streaming module 308 executes on a remote computing machine, and streams the multimedia data from a virtual channel 306 between a computing machine and the remote computing machine. The multimedia data, in some embodiments, is generated by a multimedia device communicating with the computing machine, transmitted over the virtual channel 306 to the remote computing machine, and streamed from the virtual channel 306 by the proxy streaming module 308. In some embodiments, an application/desktop delivery system 322, 322' or remoting application receives the multimedia data transmitted over the virtual channel 306 and the proxy streaming module 308 streams the multimedia data from the application/desktop delivery system 322, 322'. In this embodiment, the proxy streaming module 308 can be a part of the application/desktop delivery system 322, 322' while being registered as a source filter within the DIRECTSHOW Framework 320, 320'.

In some embodiments, the multimedia data stream is decoded (Step 534). The proxy streaming module 308, in some embodiments, decodes the multimedia data stream, while in other embodiments the application/desktop delivery system 322, 322' or remoting application decodes the multimedia data stream. In some embodiments, the multimedia data stream is decoded using codecs 324, 324'.

In some embodiments, the proxy streaming module 308 passes or streams the multimedia data to other filters or modules executing within the DIRECTSHOW Framework 320, 320' (Step 536). Passing the multimedia data to the filters and modules can include streaming, transmitting or otherwise sending the multimedia data to the filters and modules. In some embodiments, the proxy streaming module 308 can stream the multimedia data to a filter or module in response to a request from a filter or module for the multimedia data. In one embodiment, the proxy streaming module 308 can stream the multimedia data to any transform filter 326, 326', renderer filter 328, 328', and/or video/application sink filter. The proxy streaming module 308, in some embodiments, in a source filter 330 such that the proxy streaming module 308 streams multimedia data to any filter or module that wants or tries to access the multimedia data. In some embodiments, the proxy streaming module 308 streams the multimedia data to filters and modules executing in the framework 320, 320' and associated with the display application 314, 314'.

In one embodiment, the multimedia data is forwarded to the display application (Step 538) and displayed by the display application (Step 540). Displaying the data can include playing, displaying or otherwise presenting the multimedia data. In one embodiment, displaying the multimedia data can include displaying video chat or web camera output within a display application such as Google Talk®, Microsoft Communicator®, Instant Messenger®, or any other display application.

The remoting application or application/desktop delivery system 322, 322' can then intercept the display application output and transmit it back to the computing machine (Step 542). For example, the remoting application can intercept output generated by Google Talk®, Microsoft Communicator®, Instant Messenger®, or any other display application and transmit that output to the computing machine. Upon receiving the output, the computing machine can display the output in an application window and/or play the output using one or more audio applications.

In some embodiments, the method 530 may not include intercepting the output generated by the display application (Step 542). Instead, in this embodiment the display application merely displays the multimedia data (Step 540). Displaying the multimedia data can include playing audio, display video or any other display or presentation of the multimedia data. In this embodiment, the second computing machine 300, (or the local computing machine communicating with the multimedia device) merely supplies the first computing machine 301 (or the remote computing machine executing the display application) with multimedia data. The first computing machine 301 displays the multimedia data and does not transmit application output to the second computing machine 300 for display on a display device connected to the second computing machine 300.

Figure 5C:
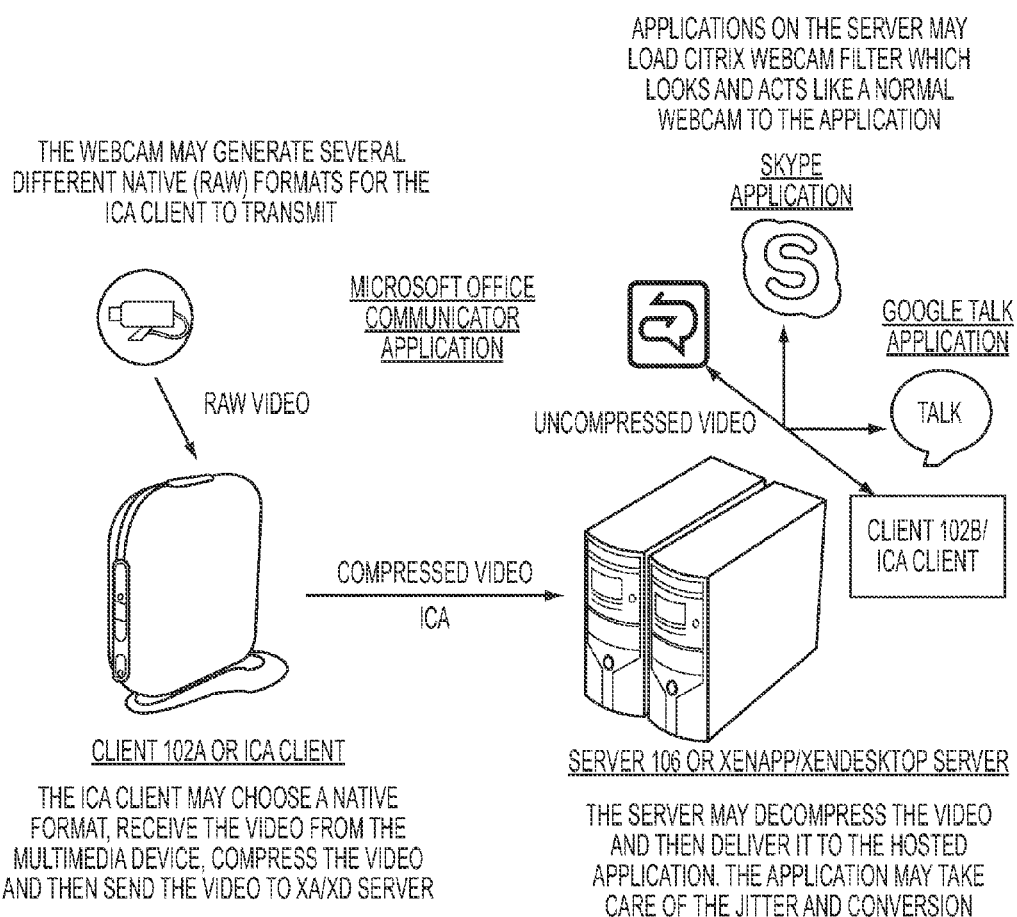
FIG. 5C illustrates a block diagram of an embodiment of a system for delivering support for desktop audio/video conferencing applications on remote network devices.

Referring now to FIG. 5C, a high level embodiment of a system for delivering support for desktop video conferencing applications on remote network devices, such as XenApp or XenDesktop is illustrated. The present system may, in some embodiments, be referred to as Helios, reverse RAVE or a bi-directional RAVE system. The system may be used for providing video conferencing solutions to users using remote XenApp & XenDesktop machines. The system may include various functions and features, such as codecs and protocols for communicating data and instructions between the client and the servers. The system may support Microsoft Office Communicator (OCS) video and audio communications between the client and the server. In some embodiments, the present system supports conferencing applications like Skype and GoogleTalk. In such embodiments, a client using a locally connected camera may use the instant messenger video conferencing that executes on a remote server. The system may be designed to be functional on multiple platforms and operating systems, including all the operating systems and platforms described herein.

In brief overview to FIG. 5C, the system illustrated may relate to an embodiment in which multiple clients are communicating using a multimedia videoconferencing application hosted on a remote server. A client 102A, also referred to as an ICA client, may be connected to a capture device, such as a microphone or a video camera. The capture device may capture and transmit to the client raw audio and/or video data. Client 102A may be interested in communicating with another client 102B via an audio and/or video conferencing application executing on the server 106. Client 102 may not have or use a locally executing multimedia videoconferencing application and may wish to use such an application executing on the server 106. The server 106, also referred to as XenApp or XenDesktop server, may host any number of audio and/or video conferencing applications, such as, for example, the Microsoft Office Communicator, Skype, GoogleTalk, Yahoo instant messenger, MSG instant messenger or any other type and form of application enabling audio and/or video conferencing. Clients 102A and 102B may establish a virtual channel with the server 106 in order to commence the audio/video conference.

The capture device, such as the webcam connected to client 102A, may generate an audio/video stream. The audio/video data may be generated in any number of formats. The ICA client 102 may pick a particular native format of the audio/video data and may compress the data in order to transmit it over the ICA to the server 106. The server 106 may decompress the data and deliver the data to the hosted application. The application may then process the data and take care of the jitter and conversion of the format as it would normally do with any data from a locally connected capture device. The multimedia application may load Citrix webcam filter which may interface with the multimedia application in a manner in which it appears to the application as a real capture device, or a camera. The filter may communicate with the application and appear as a standard capture device, thus enabling the application to receive the raw data from the remote capture device via the filter while treating the data as if received from a local capture device. In such instances, the application may treat the filter which delivers the data from the remote client 102, as the standard, locally connected capture device or a camera. The application may therefore receive the raw data and process the data as if the data was generated from a local video camera, based on the settings by which the application believes that the filter provided is in fact the camera itself.

Figure 5D:
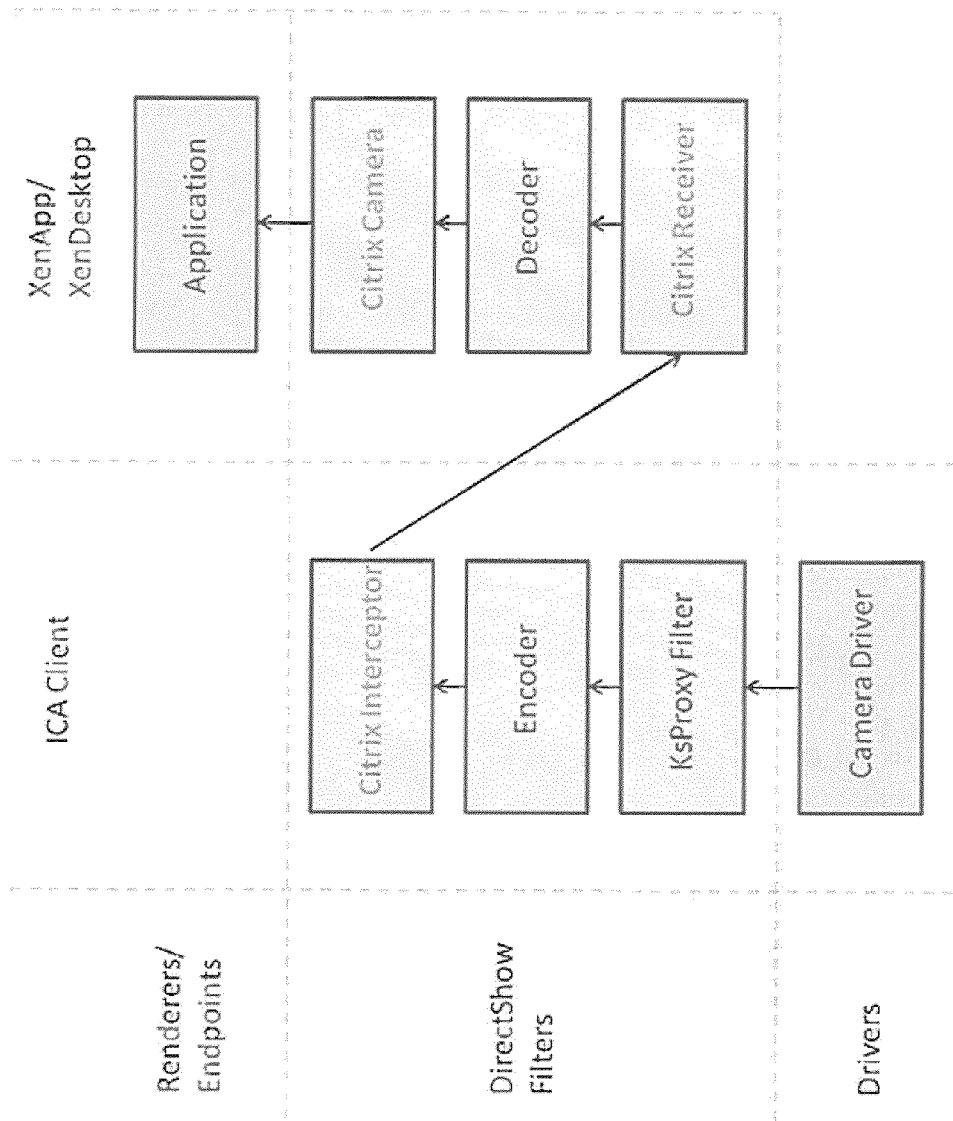
FIG. 5D illustrates a block diagram of an embodiment of one or more filters to enable a multimedia application on a remote server to process audio/video data generated by a capture device connected to a client machine.

Referring now to FIG. 5D, an embodiment of a system that uses one or more custom made filters to enable a multimedia application on a remote server to process audio/video data generated by a capture device connected to a client machine is illustrated. In brief overview, the system may leverage DirectShow technology as a part of the Microsoft Windows operating system in order to intercept video from the capture devices, transcode and compress the video is illustrated. Generally, manufacturers of capture devices may supply drivers that plugin to Microsoft's Kernel Streaming architecture. DirectShow may include a layer that sits on top of the Kernel Streaming layer that may exchange data between applications and the capture devices. Such a DirectShow layer may be implemented as a normal filter that interacts with the multimedia topology much the same way other filters do. In some embodiments, a custom made filter may be designed and provided to replace the functionality of the DirectShow capture filter. DirectShow may provide an API for implementing this feature, so no hooks may be needed. In some embodiments, the custom filter may be registered under capture devices category, thus making the filter available to the system device enumerator. When hosted capture applications enumerate the capture devices, such as the cameras or microphones, these hosted capture applications may instantiate the system device enumerator and then enumerate the capture devices category. In essence, the new capture filter may become visible to the hosted applications as just another webcam. In such embodiments, the users may only need to select a selection option associated with the filter in the application options. Once the new capture filter is loaded by the application, the filter may communicate with the client over the ICA protocol.

Typically, capture devices may provide several different formats that capture applications can choose from. DirectShow may provide an interface, such as IAMStreamConfig interface, which applications may use to select the output format of the capture device. The new capture filter may implement this interface and return raw formats that are compatible with the codec being used for the system. The ICA client may then create a filter graph and loads the capture device along with a video sink filter. The video sink filter may be designed to receive the video from the capture device and to communicate with the host-side capture filter over ICA. Such a filter may be visible to the applications as just another webcam, so users only need to select it in the application options. Once this webcam filter is loaded by the application, it may communicate with the client over the ICA protocol. FIG. 5D illustrates an embodiment of system in which a number of filters of the system are illustrated. In some embodiments, the system supplies 3 filters that plug-in to the DirectShow filtergraph (pipeline). These filters may include the Citrix interceptor filter, the Citrix receiver filter and the aforementioned webcam capture filter. The rest of the filters illustrated in FIG. 5D may be standard Microsoft or third-party components. When a webcam filter gets loaded by the application on the server, this filter may send a message to the client to create a filtergraph and load the real webcam along with the encoder and interceptor filter. When the application begins requesting data from the webcam filter, the request may be forwarded to the client, which then may start pushing media samples upstream. The system may include functionality for audio and video synchronization to ensure that the audio and video streams delivered are in sync. In some embodiments, the application, such as the Microsoft Office Communicator, Skype or GoogleTalk may render the video incoming to the server using a graphics API, which is then remoted as a graphics virtual channel over ICA. In some embodiments, the incoming as well as outgoing stream may be compressed. For example, the multimedia incoming stream, comprising audio and/or video, may be remoted over forward (host to client) RAVE, or the Multimedia Acceleration Virtual Channel. Upon receipt, the client may then decompresses and render the multimedia stream. In some embodiments, the multimedia stream gets rendered in the host session. For video, this may result in GDI/graphics operations to be transmitted to the client rather than the compressed native video. For audio, the data is delivered as raw or PCM format to the Citrix Remote audio endpoint component in the remote session. The Citrix Remote audio endpoint might compress it before sending it over an audio Virtual Channel to the ICA client. The ICA client then may decompress the audio data and render it.

Figure 5E:
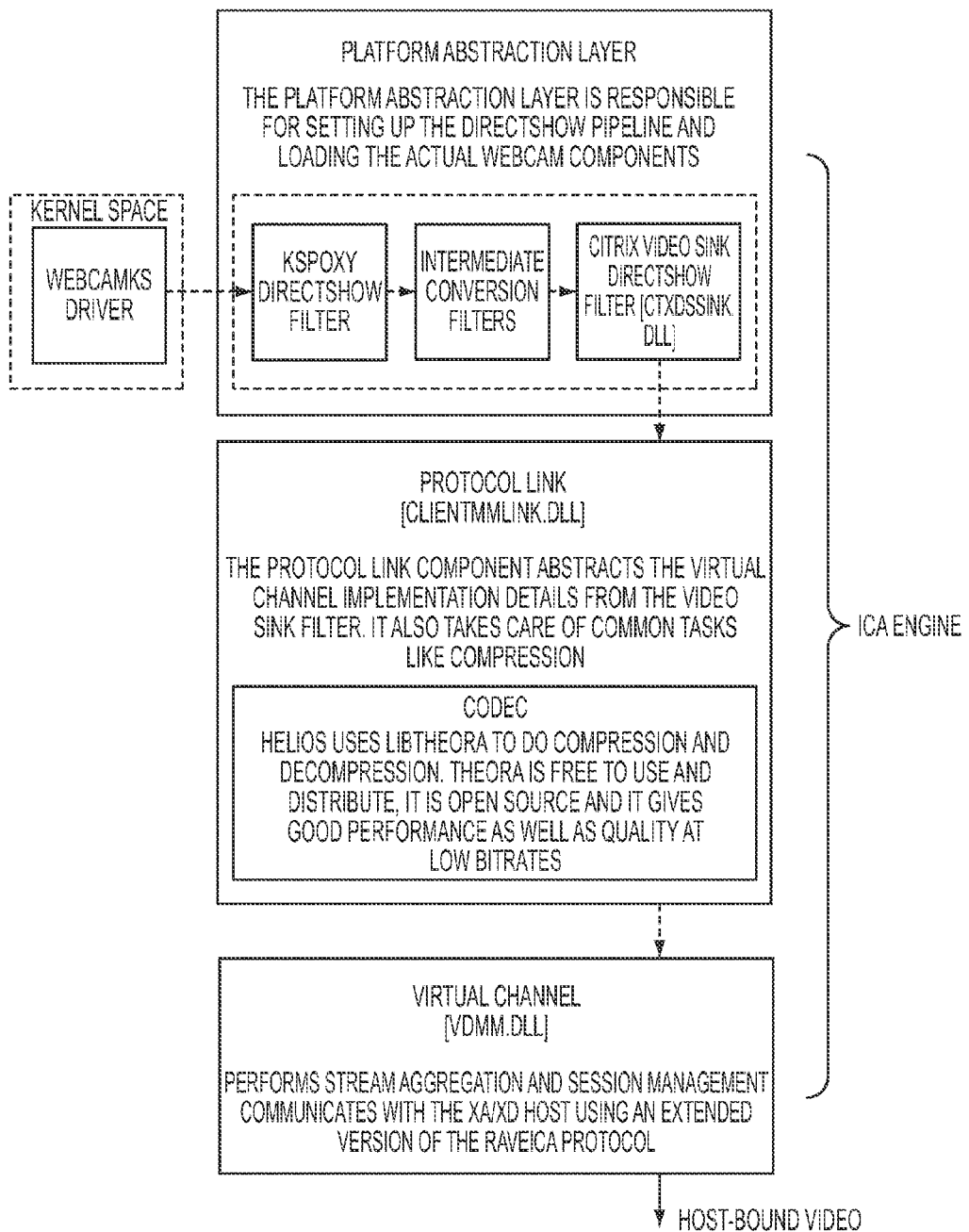
FIG. 5E illustrates a block diagram of an embodiment of an ICA engine processing multimedia data on a client.

Referring now to FIG. 5E, an embodiment of an ICA engine is illustrated. The ICA engine may be referred to as a high level abstraction of the process operations on a client side with respect to the data capture and transmission to the server 106. In brief overview, a driver of a capture device, such as a Webcam KS Driver operates in the kernel space of the client 102. Platform abstraction layer may be responsible for setting up the DirectShow pipeline and loading the actual webcam components, such as for example the data generated by the capture device. The webcam KS driver may communicate with KsProxy DirectShow Filter, which may then forward the data to the intermediate conversion filters which finally forward the data to Citrix Video Sink DirectShow filter, which may also be known as CtxDSSink.dll. The data may then be forwarded to Protocol Link, also referred to as ClientMMLink.dll. The protocol link component may abstract the virtual channel implementation details from the video sink filter. The protocol link may also take care of the common tasks, such as for example compression. One or more codecs may be used for compression or decompression. In some embodiments, system may use Theora codec for compression and/or decompression. The data may be forwarded to the virtual channel, which may also be referred to as vdmm.dll. Virtual channel may perform stream aggregation and session management. Virtual channel may also maintain communication with the server 106, such as the XenApp/XenDesktop server host using an extended version of RAVE ICA protocol. The data may then be transmitted over to the server 106.

The system may compress the video on the client before sending it over the network. Compression may be needed in order to reduce the amount of bandwidth consumed by the video. For example, 30 frames per second of raw RGB24 data at CIF 352×288 resolution may require about 72990720 bps (almost 73 Mbps!). Clients may consume less CPU cycles compressing the video and then sending it over the network compared to just sending huge amounts of uncompressed video.

The codec used may be any codec for processing audio and/or video data. In some embodiments, the codec comprises source code that is editable in order to modify it and incorporate it into the filters/sinks for each multimedia platform. The coded may also need it to be able to control the encoder settings in real-time. In some embodiments, the codec does not have any hard dependencies on the platform which would preclude us from incorporating it into other platforms, such as for example Windows, Linux or Macintosh. In further embodiments, the codec is fast enough to process at least 30 frames per second or more. In some embodiments, the codec processes at any speed, such as 10 frames per second, 20 frames per second, 30 frames per second, 40 frames per second, 50 frames per second, 60 frames per second, 70 frames per second, 80 frames per second, 90 frames per second or 100 frames per second. In further embodiments, the codec processes data at more than 100 frames per second, such as 110, 120, 150, 180, 200 and up 500 frames per second.

Figure 5F:
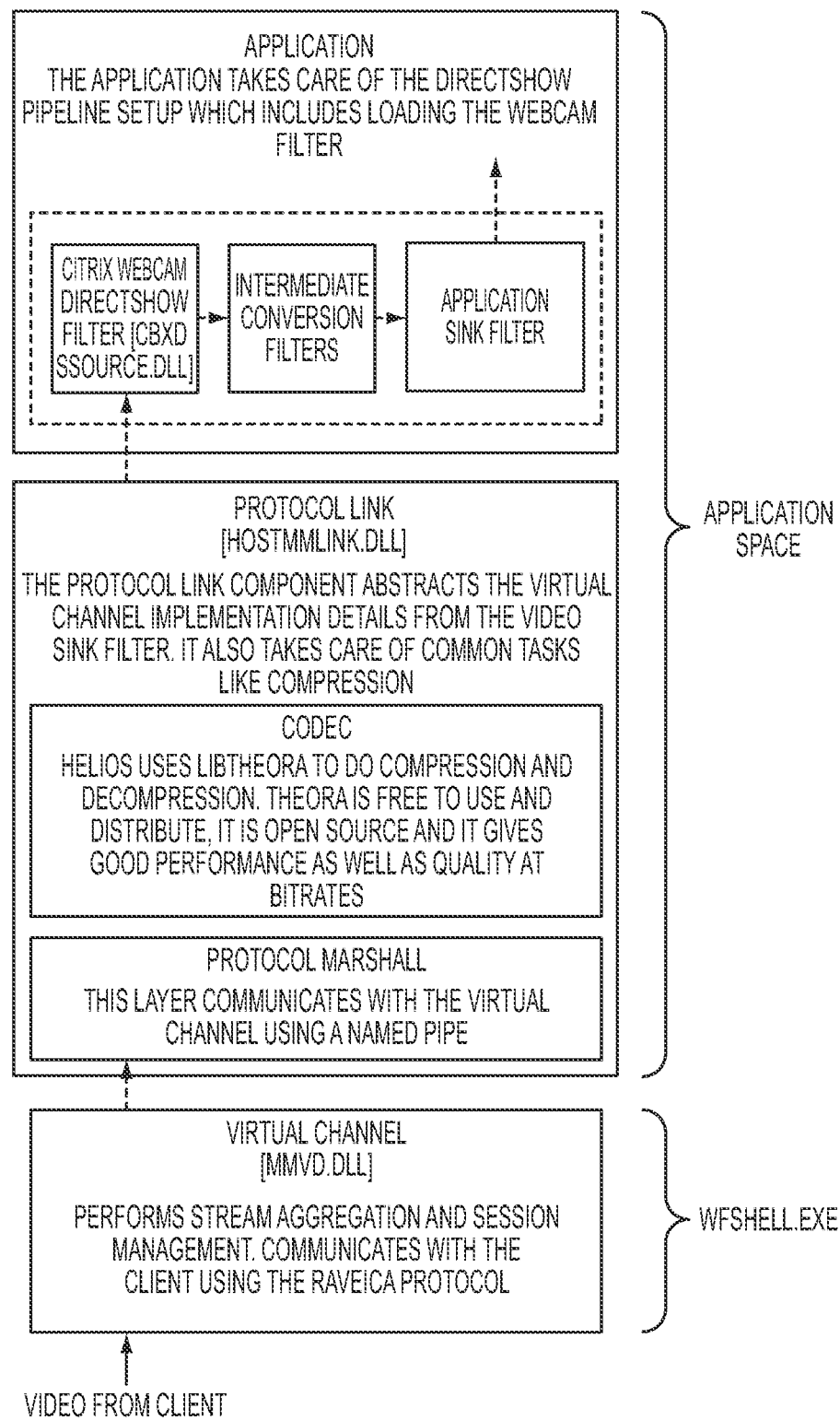
FIG. 5F illustrates a block diagram of an embodiment of an application space on a remote hosting server, processing multimedia data received from a remote client.

Referring now to FIG. 5F, an embodiment of an application space is illustrated. The video may be received from the virtual channel implemented in mmvd.dll. The virtual channel may be hosted in the Wfshell.exe process. The virtual channel may perform stream aggregation and session management and may communicate with the client using the RAVE ICA protocol. Data may be transmitted up to the protocol marshalling interface. The protocol marshalling interface may be a layer that communicates with the virtual channel using a named pipe. Codec may receive data and may compress or decompress the data using Theora functionality. The data may be forwarded to the protocol link, also referred to as HostMMLink.dll. The protocol link component may abstract the virtual channel implementation details from the video sink filter and take care of the compression/decompression, as necessary. Data may be received and processed by Citrix Webcam DirectShow filter, which may forward it to the intermediate conversion filters, which may then forward the data to application sink filter. Application, which had already taken care of the DirectShow pipeline and setup the webcam filter, may receive the data, and display it.

Figure 5G:
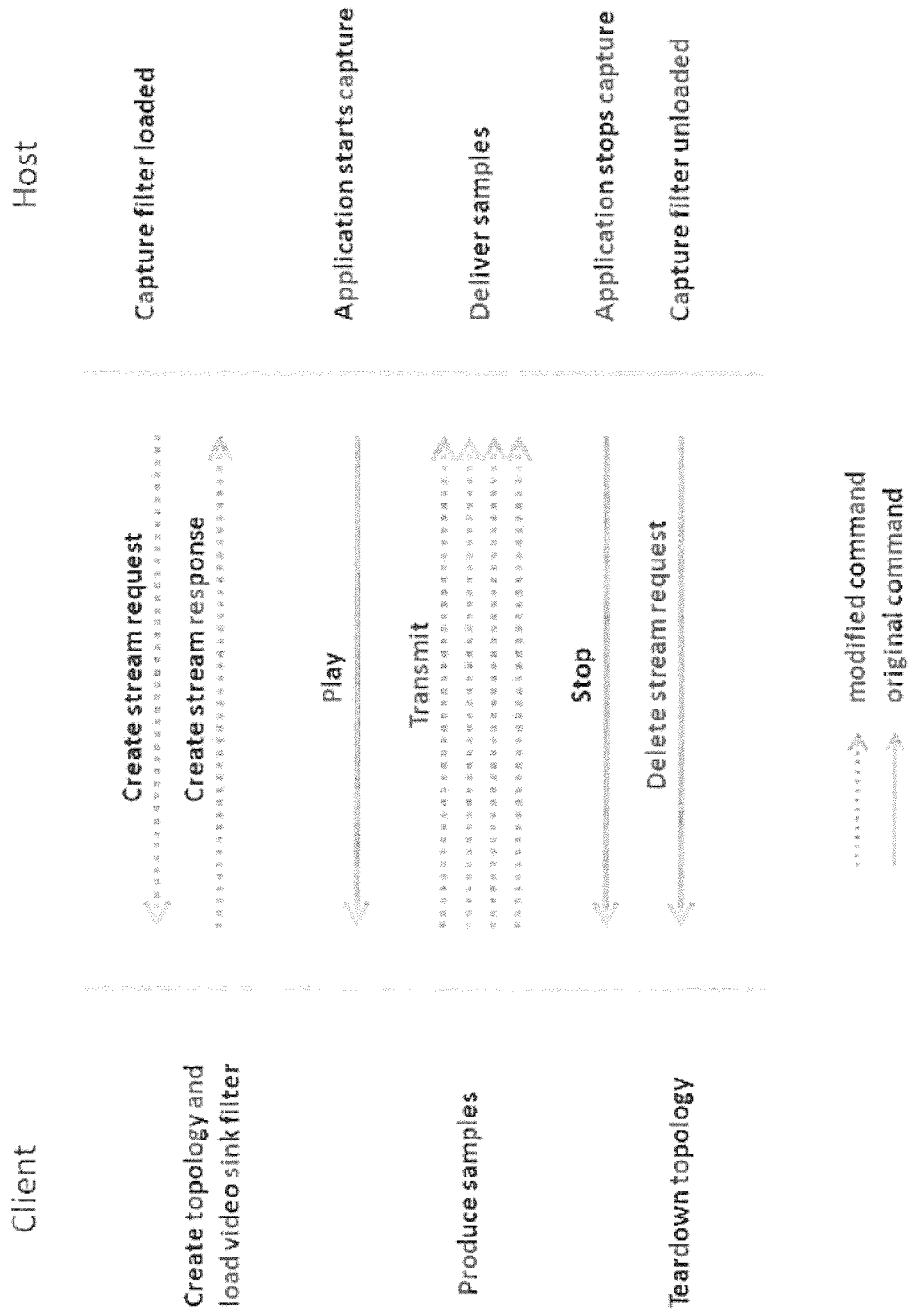
FIG. 5G illustrates an embodiment of a protocol sequence for communicating multimedia data via a virtual channel between a client and a hosting server.

Referring now to FIG. 5G, an embodiment of a protocol sequence is illustrated. The protocol sequence may be designed to minimize the protocol related code inside of the filters. The filters may be modified to handle things that are specific to the multimedia platform, while being as independent from the protocol sequence as possible. All other common functionality may be abstracted out of the filters and put in a common component. Such feature may make it easier to port the filters to other multimedia frameworks, such as, for example Windows Media Foundation and GStreamer. In some embodiments, the system may re-use and leverage the existing RAVE virtual channel instead of creating a new one. In such embodiments, an existing ICA virtual channel system may provide any available virtual channels via which the present system may operate.

Referring to FIG. 5G in greater detail a protocol sequence between a host and a client is illustrated. A host, such as a server 106, may transmit a create stream request to a client 102. The client may transmit create stream response back to the server 106. The client may create topology and load video sink filter. The host server may load the capture filter, such as the customized filter which the application treats as a capture device. Application on the host may start the capture. The instruction to play may be transmitted from the host server to the client. The client may produce the samples using the capture device and transmit the samples to the host server. The host server may deliver the samples to the application. The application, mistaking the capture filter for the capture device will operate as if the data was being delivered from a locally connected capture device. Once the application sends the instruction to stop the capture, the client tears down the topology. The host server may transmit the request to delete the stream request. The host may also unload the capture filter.

In yet another embodiment, the client machine can directly (locally) display the multimedia data captured by the local multimedia device in an application output window. This operation may be referred to as a local preview and may be an optimization compared to streaming the data from the server machine back to the client machine where it originated. The client machine may need to be made aware of where and how to display the data, such as for example the parent app window, preview window size, position, in-remote-session clipping. The client machine may receive control information instead of the multimedia data from the presentation application running on the server machine.

For example, in some embodiments in which two clients communicate via teleconference the multimedia data captured by a local multimedia capture device on a first client may be processed, rendered and displayed locally on the first client directly, while only the application output multimedia data from a second client processed by the presentation application on the remote server is received from the remote server. In such embodiments, the second client may also process and display the locally generated multimedia data on the second client, while receiving from the remote server the multimedia application output data of the first client from the remote server. In such embodiments, both clients can help save the bandwidth by not requiring the remote server to transmit back the locally generated multimedia stream but instead using the locally generated multimedia to display it locally while relying on the remote server only to deliver the multimedia output data of the multimedia stream generated from the other remote client. Both host server and client machines may be configured to be senders as well as receivers of commands or instructions needed to transmit and/or process the multimedia data. In more detail in reference to FIG. 5G, virtual channel protocol communication between the client and the host server, which may also be referred to as RAVE VC or RAVE virtual channel, may be negotiated in order to facilitate the transmission of multimedia data between the client and server. Client to host (or client to host server) media streams or transmissions may be supported based on a version of protocol or a type of settings.

Client-to-host (C2H) media streams may allow for selection of a specific capture device by the host, negotiation of native media types (including resolution) supported by the device, and negotiation of optional RAVE VC-level compression media types, such as the Theora codec. The Multimedia Virtual Channel Protocol may comprise the support for C2H (capture) media streams, which may be known as reverse-RAVE, which may also be negotiated by means of the CTXMM_TYPE_CAPABILITY_C2H_MEDIA_STREAMS capability. The exact media stream type may be determined by the type of media property elements supplied in the MMVD_CMD_CREATE_CONTEXT_REQUEST command.

In one example, the client may notify the host of media capture devices over the Control Virtual Channel (VC) by means of Plug-and-Play (PnP) notifications. The Control VC may supply a media capture device description and a non-empty list of native media Types supported by the device. As part of a type, the capture resolution may be defined. For example, for clients that do not implement this capability over the Control VC, the host may assume the presence of one default Device with default (uncompressed/raw) native Type and default resolution. The host server, as well as the presentation application may select a specific media device, and also requests the usage of a specific native media type to be used with the selected device, plus the compression media types supported by the host that can be used over the RAVE VC, listed in order of decreasing preference. If only one Type is supplied, then no compression may be applied by the RAVE VC itself, although the native media type supported by the selected device could still be a compressed type. If more than one Type is supplied, the client may decide whether to use compression over the RAVE VC itself by choosing one of the media types supplied by the host.

Any compression type may be used for compressing the data. The compression type capability negotiation may be implemented on a per stream context basis, as opposed to globally for the ICA session in order to provide more flexibility. For example, the RAVE VC might encode directly in a media type format that the host presentation application expects and avoid trans-coding over the VC.

Plug and play notifications may be transmitted between the client and the hosting server in order to enable the server to treat a filter or a function associated with the client and executing on the server as a multimedia capture device. In some embodiments, a plug and play notification is transmitted from the client to the server via a virtual channel. At the server side, an agent, such as a filter associated with multimedia communication between the server and the client, may receive the plug and play notification and pass it on to the relevant presentation application. The application may process the plug and play notification and identify the agent or the function executing on the server as a particular capture device, such as a web camera or a microphone locally connected to the server. In actuality, the agent may only represent a function for the hosted application's communication with a capture device, such as a web camera connected to the client. The application may then communicate with the agent as if it is a multimedia capture device. The agent may forward the communication, instructions and data, as necessary, between the client and the presentation application. As such, the hosted application may process the data from the remote capture device, as necessary. Plug and play features are described in U.S. Pat. No. 7,702,750, entitled "System and Method for Event Detection and Re-direction over a Network using a Presentation Level Protocol", filed on Sep. 29, 2004 and U.S. patent application Ser. No. 12/763,492, entitled "System and Method for Event Detection and Re-direction over a Network Using a Presentation Level Protocol", filed on Apr. 20, 2010, both of which are incorporated herein by reference in their entirety.

In some embodiments, in order to set up a direct, client to client streaming, a direct connection between the endpoint A and endpoint B needs to be established. Endpoint A' (in the virtualized session on the server) may only serve as a proxy for hand-shake and control with Endpoint B, but the video is channeled from the local web cam (Endpoint A) directly to Endpoint B. Endpoint A may be a local Web Cam on the local client machine. Endpoint A' may be referred to as the application in the virtualized/remote session. Endpoint B may include the entity on the other side of the video/audio communication. In some embodiments, the client side video sampling rate may vary based on bandwidth availability in order to achieve optimal throughput and maximum possible quality.

While certain exemplary embodiments have been described and shown in the accompanying drawings, it is to be understood that such embodiments are merely illustrative of and not restrictive on the methods and systems described herein. Additionally, it is possible to implement the methods and systems described herein or some of its features in hardware, programmable devices, firmware, software or a combination thereof. The methods and systems described herein or parts of the methods and systems described herein may also be embodied in a processor-readable storage medium or machine-readable medium such as a magnetic (e.g., hard drive, floppy drive), optical (e.g., compact disk, digital versatile disk, etc), or semiconductor storage medium (volatile and non-volatile).

We claim:

1. A system for displaying on a local computing device, by an application executing on a remote computing device, raw multimedia data generated by a multimedia device connected to the local computing device, the remote computing device in communication with the local computing device via a virtual channel, the system comprising:
   a local computing device;
   a multimedia device communicating with the local computing device, the multimedia device generating raw multimedia data;
   a remote computing device hosting the execution of a proxy streaming module to receive raw multimedia data passed by the local computing device to the proxy streaming module via a virtual channel and to forward the raw multimedia data to a presentation application executing on the remote computing device;
   wherein the presentation application generates formatted multimedia application output from the raw multimedia data and the remoting application intercepts the generated formatted multimedia application output generated from the raw multimedia data prior to the display of the formatted multimedia application output by the remote computing device, encapsulates the intercepted formatted multimedia application output generated from the raw multimedia data in a presentation level protocol, and transmits the formatted multimedia application output generated from the raw multimedia data to the local computing device, wherein the local computing device receives and unencapsulates the encapsulated formatted multimedia application output generated from the raw multimedia data and displays the formatted multimedia application output generated from the raw multimedia data in an application output window of the local computing device.

2. The system of claim 1, further comprising a local remoting application executing on the local computing device transmitting the raw multimedia data to the remote computing device over the virtual channel.

3. The system of claim 2, wherein the local remoting application executing on the local computing device constructs a packet to include the raw multimedia data in a protocol wrapper before transmitting the packet comprising the raw multimedia data to the remote computing device.

4. The system of claim 3, wherein the remoting application executing on the remote computing device deconstructs the packet by extracting the raw multimedia data from the packet before forwarding the raw multimedia data to the presentation application.

5. The system of claim 2, further comprising a streaming module executing on the local computing device streaming the raw multimedia data from a multimedia interface to the remoting application executing on the local computing device.

6. The system of claim 1, further comprising an encoder executing on the local computing device encoding the raw multimedia data before transmitting the raw multimedia data to the remote computing device.

7. The system of claim 6, further comprising a decoder executing on the remote computing device to decode the raw multimedia data before forwarding the raw multimedia data to the presentation application.

8. The system of claim 1, wherein the raw multimedia data is passed to the proxy streaming module responsive to receiving a request from a user of the local computing device to execute the presentation application.

9. The system of claim 1, wherein the presentation application stores the raw multimedia data in a storage repository.

10. A method for displaying on a local computing device, by an application executing on a remote computing device, raw multimedia data generated by a multimedia device connected to the local computing device, the remote computer device in communication with the local computing device via a virtual channel, the method comprising:
    receiving, by a proxy streaming module executing on a remote computing device, raw multimedia data via a virtual channel, the raw multimedia data generated by a multimedia device associated with the local computing device and passed by the local computing device to the proxy streaming module;
    forwarding, by the proxy streaming module, the raw multimedia data to a presentation application executing on the remote computing device, the presentation application generating formatted multimedia application output from the raw multimedia data;
    intercepting, by a remoting application executing on the remote computing device, the formatted multimedia application output generated from the raw multimedia data prior to the display of the formatted multimedia application output by the remote computing device;
    encapsulating, by the remoting application executing on the remote computing device, the intercepted formatted multimedia application output generated from the raw multimedia data in a presentation level protocol; and
    transmitting, via the virtual channel, by the remoting application executing on the remote computing device, the encapsulated formatted multimedia application output generated from the raw multimedia data to the local computing device, wherein the local device receives and unencapsulates the encapsulated formatted multimedia application output generated from the raw multimedia data and displays the formatted multimedia application output generated from the raw multimedia data in an application output window on the local computing device.

11. The method of claim 1, further comprising transmitting, by a local streaming module executing on the local computing device, the raw multimedia data to the remote computing device via the virtual channel.

12. The method of claim 11, further comprising:
    streaming, by a local streaming module executing on the local computing device, the raw multimedia data from a multimedia device interface; and
    streaming, by the local streaming module executing on the local computing device, the raw multimedia data to a local remoting application executing on the local computing device.

13. The method of claim 1, further comprising encoding, by an encoder executing on the local computing device, the raw multimedia data before transmitting the raw multimedia data to the remote computing device.

14. The method of claim 13, further comprising decoding, by a decoder executing on the remote computing device, the raw multimedia data before forwarding the raw multimedia data to the presentation application.

15. The method of claim 1, further comprising constructing a packet, by a local remoting application on the local computing device, to include the raw multimedia data in a protocol wrapper before transmitting the packet comprising the raw multimedia data to the remote computing device.

16. The method of claim 15, further comprising deconstructing the packet, by the remoting application executing on the remote computing device, to extract the raw multimedia data from the packet before forwarding the raw multimedia data to the presentation application.

17. The method of claim 1, wherein the raw multimedia data is passed to the proxy streaming module responsive to receiving a request to execute the presentation application from a user of the local computing device.

18. The method of claim 1, further comprising encrypting, by an encoder executing on the local computing device, the raw multimedia data before transmitting the raw multimedia data to the remote computing device.

19. The method of claim 1, further comprising decrypting, by a decoder executing on the remote computing device, the raw multimedia data received from the local computing device.

20. The method of claim 1, further comprising storing, by the presentation application, the raw multimedia data in a storage repository.

21. The method of claim 1, wherein intercepting the formatted multimedia application output comprises:
   intercepting a call; and
   extracting the formatted application data from the call.

22. A method for displaying on a client device, by an application executing on a remote server, raw multimedia data generated by a multimedia device connected to the client device, the method comprising:
   transforming, by one or more filters of the client device, raw multimedia data to conform to a protocol of a virtual channel established between the client device and a remote server;
   forwarding, by a streaming module executing on the client device, the raw multimedia data to the remote server via the virtual channel;
   receiving, by a proxy streaming module executing on the remote server, the raw multimedia data received from the client device via the virtual channel;
   forwarding, by the proxy streaming module, the raw multimedia data to a presentation application executing on the remote server;
   intercepting, by a remoting application executing on the remote server, formatted application output generated from the raw multimedia data by the presentation application prior to the display of the formatted application output;
   encapsulating, by the remoting application executing on the remote computing device, the intercepted formatted multimedia application output generated from the raw multimedia data in a presentation level protocol; and
   transmitting, via the virtual channel, by the remoting application executing on the remote server, the encapsulated formatted application output generated from the raw multimedia data to the local client device;
   receiving, by the client device, the encapsulated formatted application output generated from the raw multimedia data;
   unencapsulating, by the client device, the encapsulated formatted application output generated from the raw multimedia data; and
   displaying, by the client device, the formatted application output in an application output window.

* * * * *